April 7, 1953   J. D. RALSTON   2,633,672
APPARATUS FOR SEALING GLASS AMPOULES
Filed April 13, 1950   11 Sheets-Sheet 1

Inventor
JOHN D. RALSTON
by Lamphere & Van Valkenburgh
Attorneys

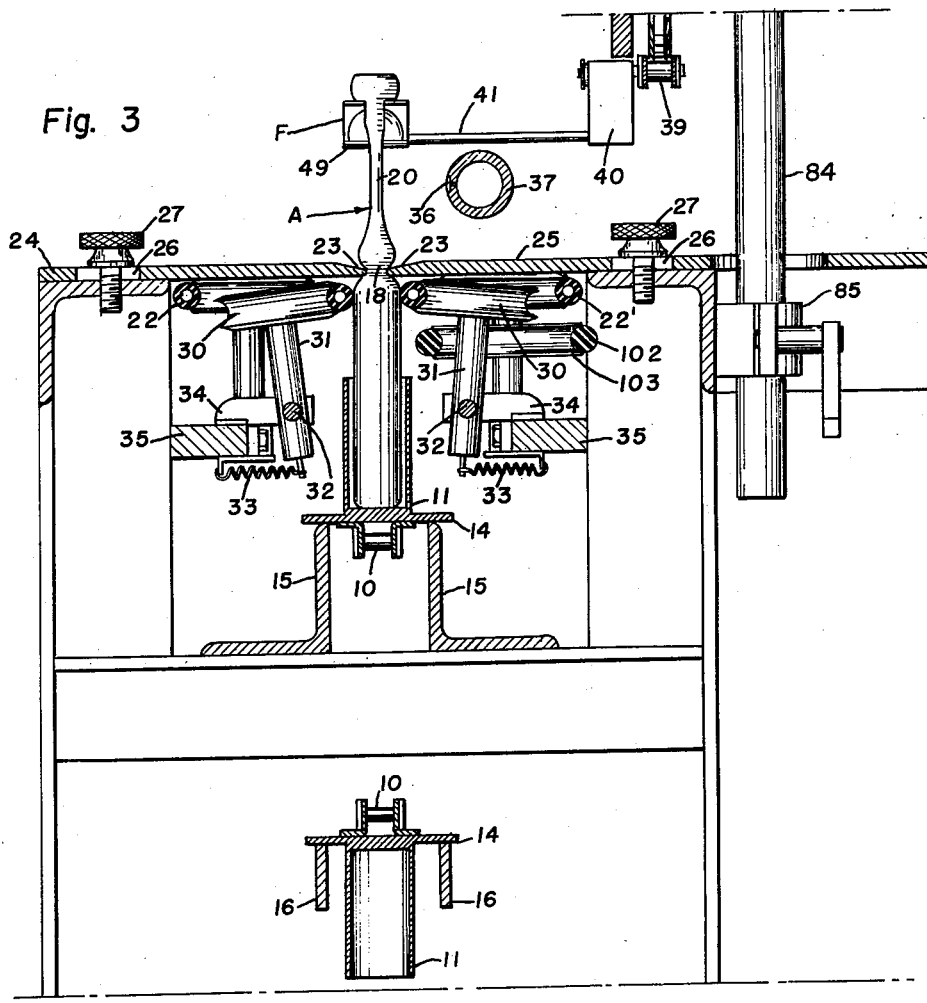
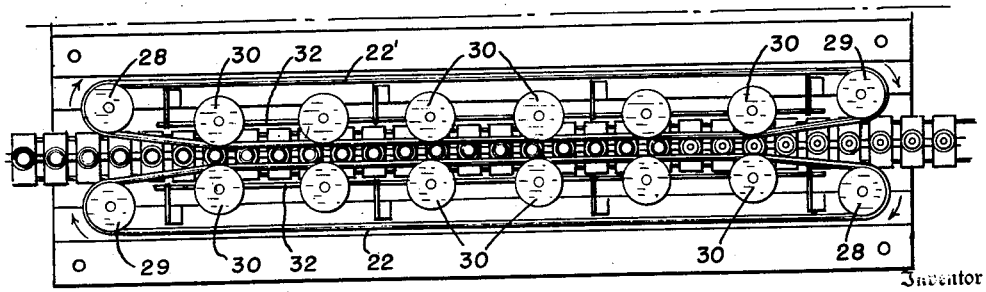

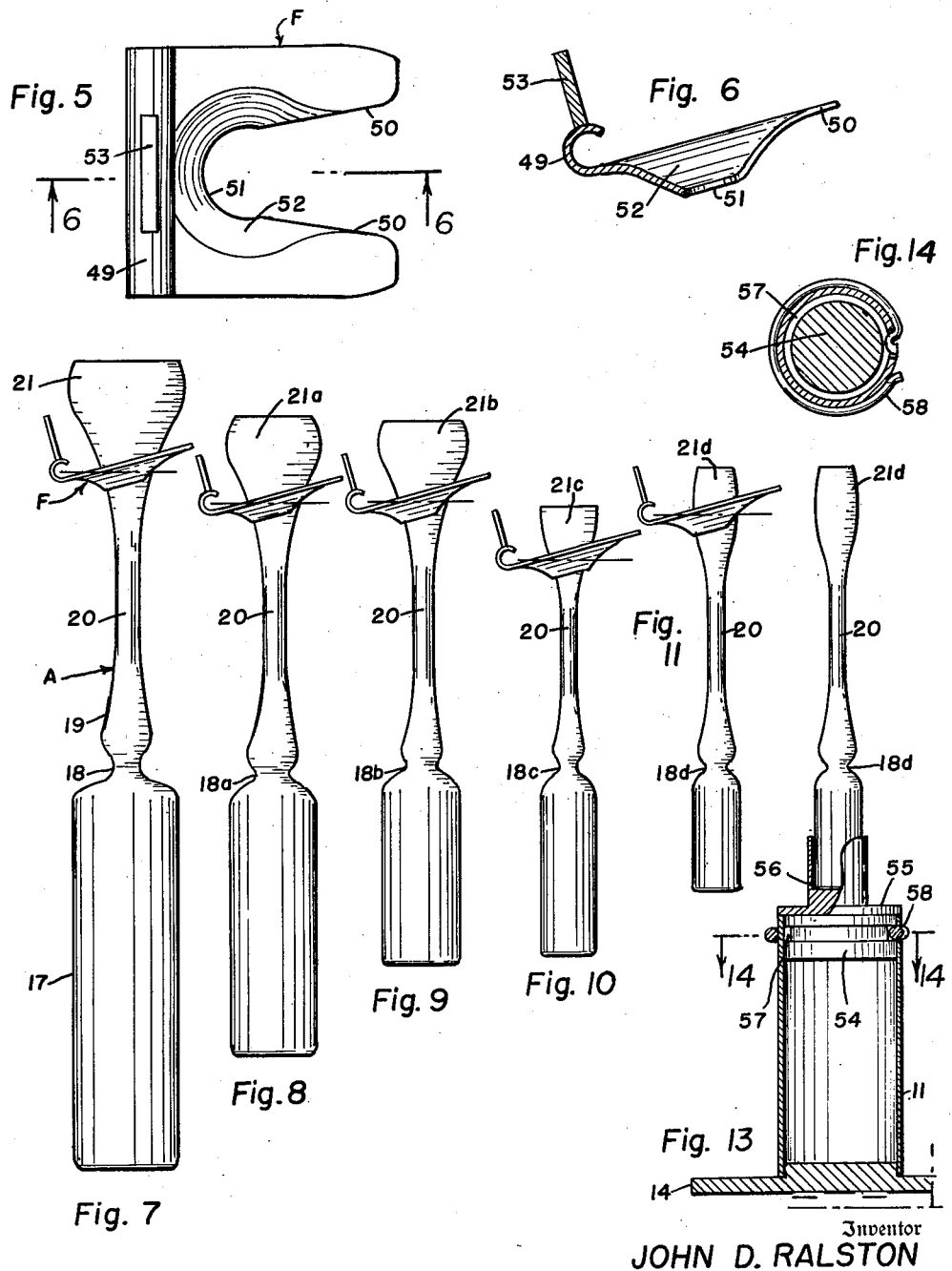

April 7, 1953  J. D. RALSTON  2,633,672
APPARATUS FOR SEALING GLASS AMPOULES
Filed April 13, 1950  11 Sheets-Sheet 5
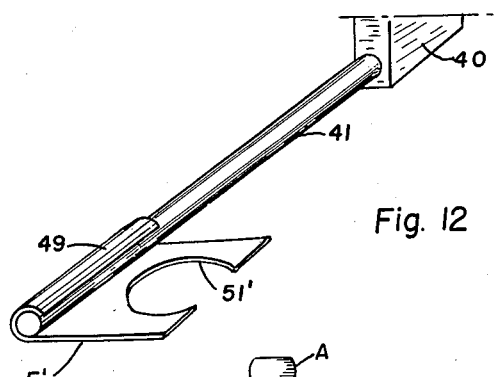
Fig. 12
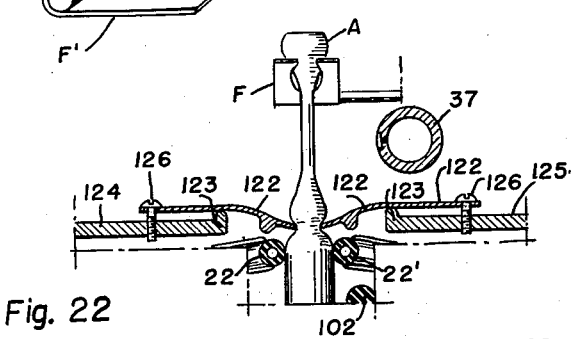
Fig. 22
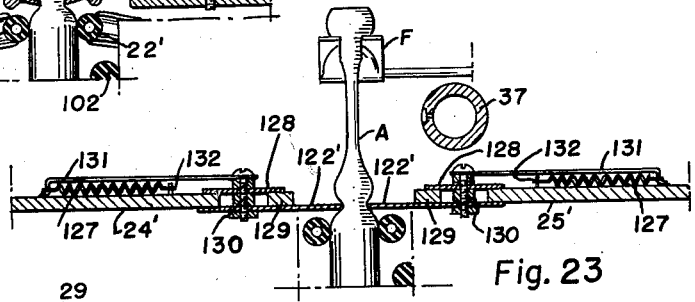
Fig. 23
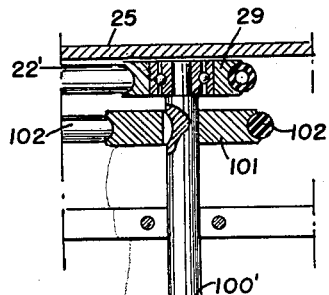
Fig. 20
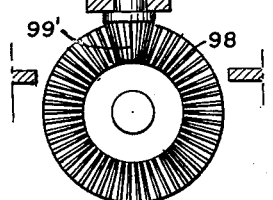
Inventor
JOHN D. RALSTON
By Lamphere & Van Valkenburgh
Attorneys

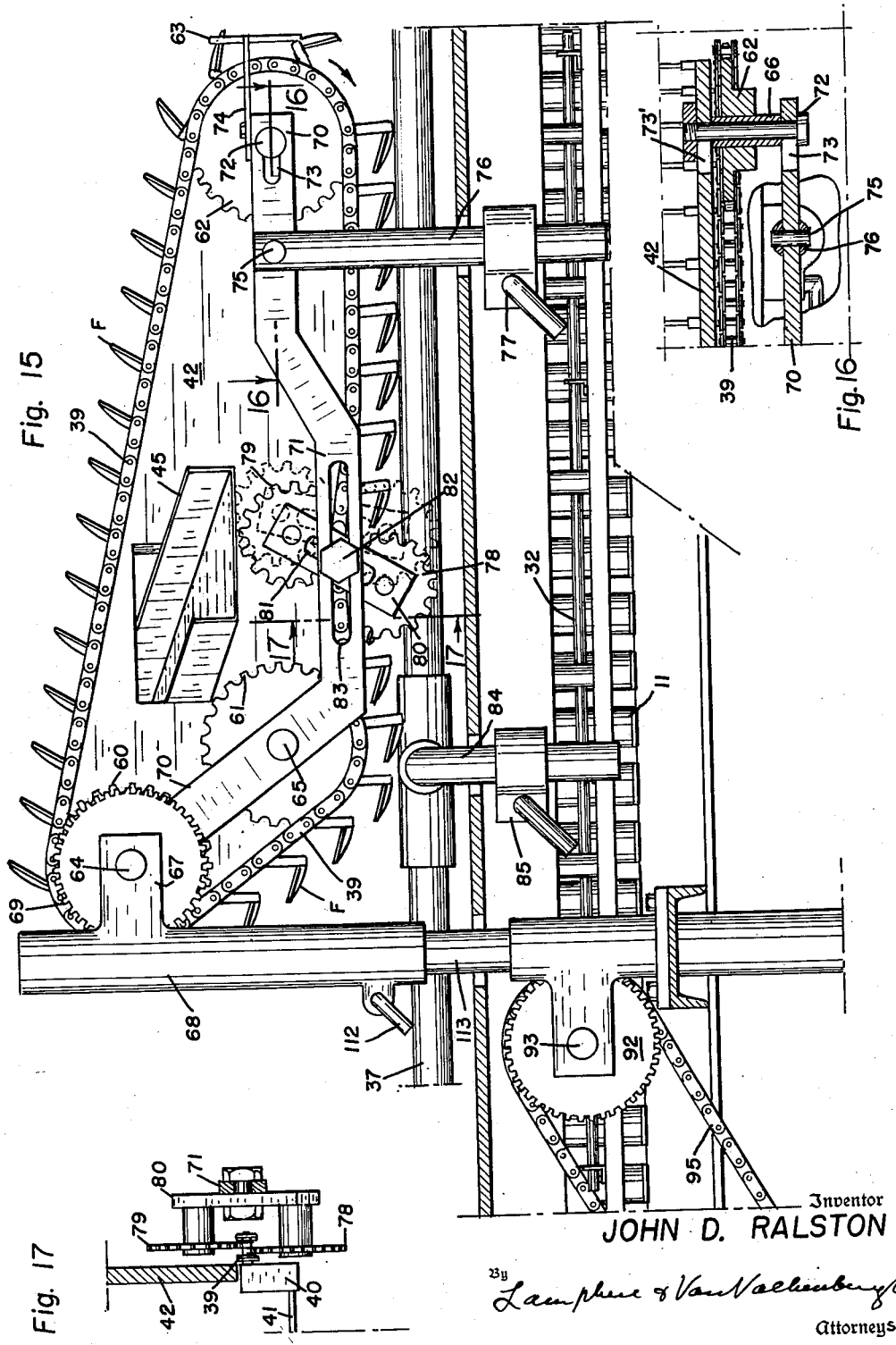

April 7, 1953

J. D. RALSTON 2,633,672

APPARATUS FOR SEALING GLASS AMPOULES

Filed April 13, 1950

Inventor
JOHN D. RALSTON
By Lanphere & Van Valkenburgh
Attorneys

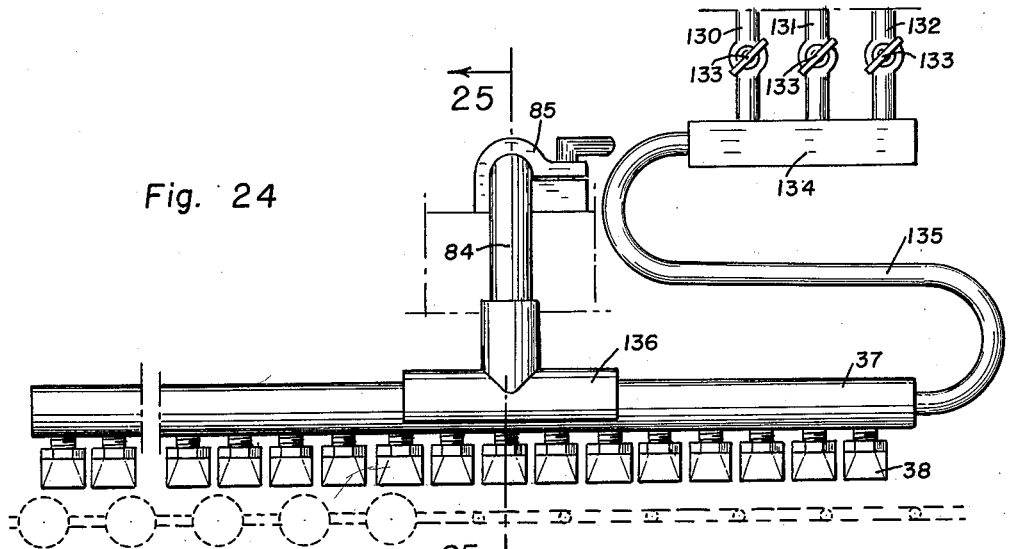
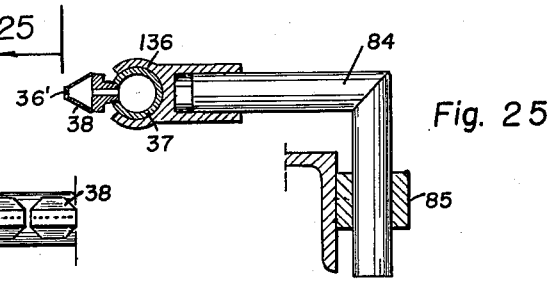
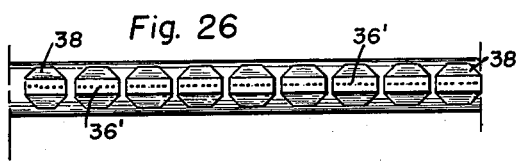
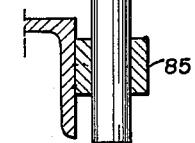
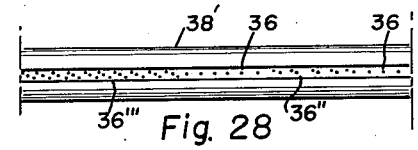
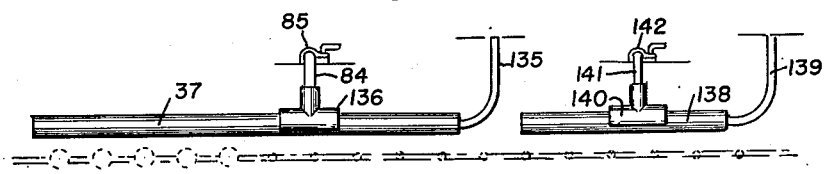

April 7, 1953 J. D. RALSTON 2,633,672
APPARATUS FOR SEALING GLASS AMPOULES
Filed April 13, 1950 11 Sheets-Sheet 9

Inventor
JOHN D. RALSTON
By Lamphere & Van Valkenburgh
Attorneys

April 7, 1953 J. D. RALSTON 2,633,672
APPARATUS FOR SEALING GLASS AMPOULES
Filed April 13, 1950 11 Sheets-Sheet 10

Inventor
JOHN D. RALSTON
By Lamphere & Van Valkenburgh
Attorneys

April 7, 1953     J. D. RALSTON     2,633,672
APPARATUS FOR SEALING GLASS AMPOULES
Filed April 13, 1950     11 Sheets-Sheet 11
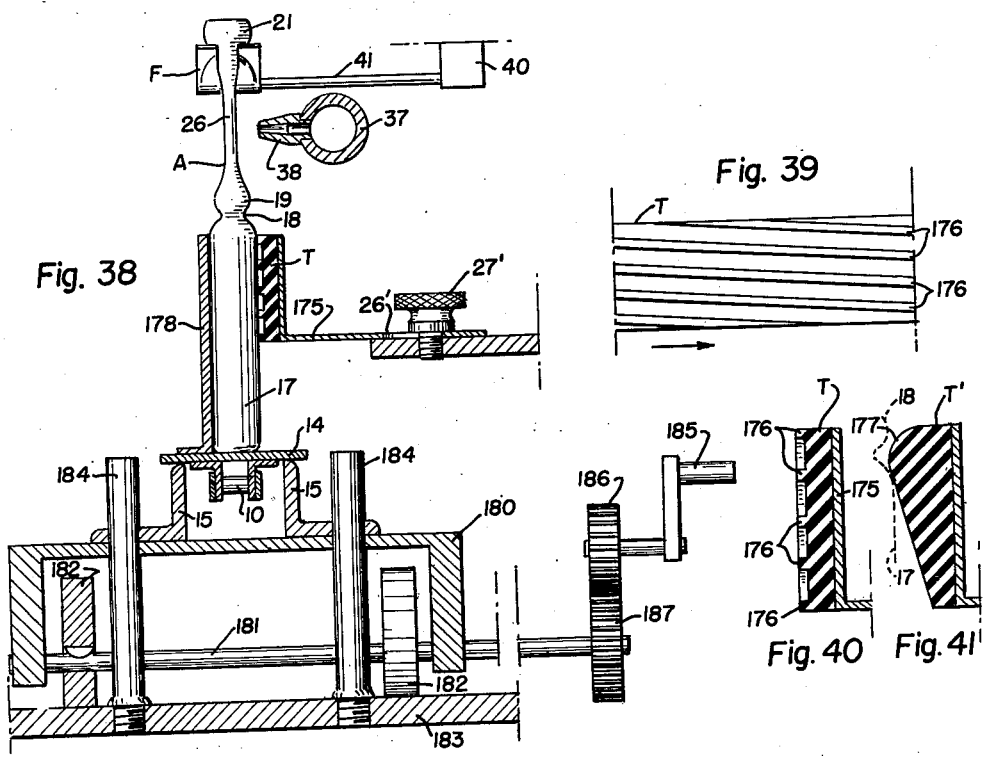
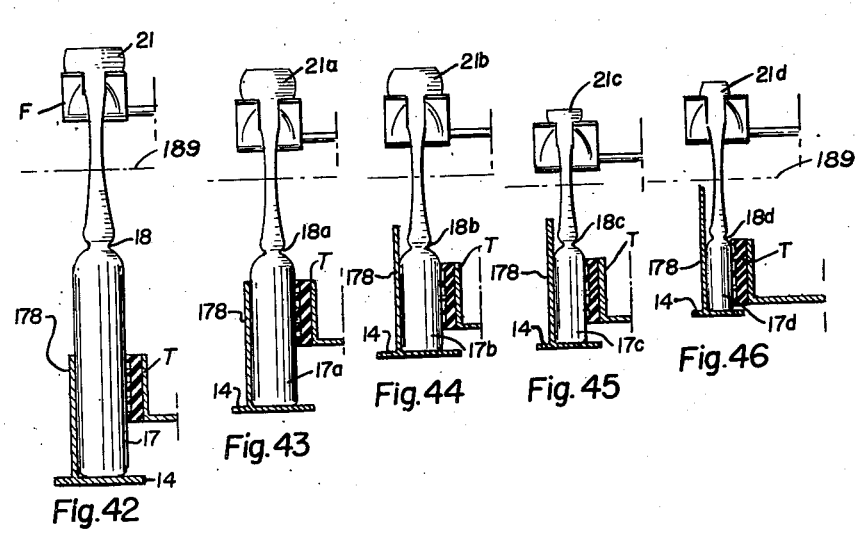
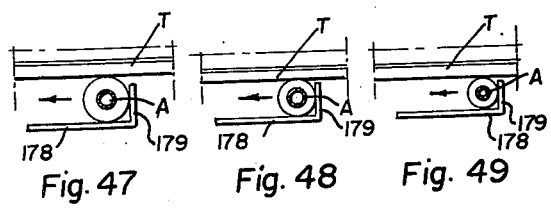
Inventor
JOHN D. RALSTON
By Lamphere & Van Valkenburgh
Attorneys Patented Apr. 7, 1953

2,633,672

UNITED STATES PATENT OFFICE 2,633,672

APPARATUS FOR SEALING GLASS AMPOULES

John D. Ralston, Indianapolis, Ind.

Application April 13, 1950, Serial No. 155,748

20 Claims. (Cl. 49—7)

This invention relates to an apparatus for sealing containers, more particularly containers which are made of glass or similar material, and is especially adapted for use in sealing ampoules and the like which contain a medicinal or pharmaceutical preparation.

Ampoules are normally made of glass and are hermetically sealed, so as to prevent contamination of the medicinal or pharmaceutical preparation contained therein, the ampoule being adapted to be broken at a particular place for access thereto when the contents are to be used. In the sealing of such containers, one general practice has been to seal the ampoules by hand operations, which are not only time consuming but also tend to produce unsightly seals and ampoules of different length, which may not fit in standard packing cartons. Also, if during the manipulation of the ampoule during sealing, any liquid in the ampoule is splashed up into or contacts a highly heated portion thereof, the glass may crack, the splashed portion of a pharmaceutical or medicinal product may become carbonized, thus producing an unwanted adulterant, or there may be a local generation of steam or vapor which produces sufficient pressure to "blow" or open up the softened glass tip. Also, often there is a rounded "gob" of glass at the top of the thin-walled stem, which produces stress and a tendency to fracture on cooling, and incomplete fusion of the top often occurs, thereby leaving a channel, perhaps microscopic in size but nevertheless an incomplete seal. This may be termed a "melted in" seal, and a "twisted" seal, produced by twisting the heated portion of the stem during sealing, tends to minimize fractures and incomplete fusion, but is extremely difficult to perform or duplicate by hand. Attempts to produce machines for sealing ampoules and the like have not been entirely satisfactory, since the capacity has been unduly low and the machines have been relatively slow in speed.

Ampoules for containing medicinals and pharmaceuticals, of a type now in general use, are provided with a narrow neck below the point at which the top is to be sealed, the narrow neck being adapted to be broken later, to permit access to the contents for use. In an earlier type, the diameter above the neck is relatively uniform, the sides above the neck thus being straight, while in a later type, the top is provided with a second neck above the first, the second neck having a portion of reduced cross sectional area adapted to be more readily sealed, and the upper end is a portion of increased diameter, which may be used as a guide in filling. In general, machines heretofore developed are adapted for use in sealing only the earlier type, the upper end of which can be fused or melted together for sealing.

Among the objects of the present invention are to provide a novel apparatus for sealing containers, particularly ampoules and the like; to provide such apparatus which may be utilized in sealing ampoules of the type having straight sides above the neck, or other types, such as the type having a second neck; to provide such apparatus which tends to reduce the amount of breakage due to splashing of the contents into a heated portion thereof; to provide an improved apparatus which may be utilized particularly in sealing ampoules or the like having relatively wide stems, or relatively thick glass, particularly at the stems; to provide an apparatus which insures that the top of the ampoule will be adequately sealed, without holes therein; to provide such apparatus which will insure that the sealed tops of the ampoules will have more nearly the same thickness of glass as the stems; to provide such apparatus which has a relatively high capacity and can be operated at a relatively high speed; to provide such apparatus in which each ampoule can be sealed in substantially the same way; to provide such apparatus which, when once adjusted for satisfactory operation, may be operated continuously with a minimum of rejects or difficulties; to provide such apparatus which may be utilized in sealing different sizes as well as types of ampoules or other containers; to provide such apparatus which may be made substantially automatic; to provide such apparatus in which the moving parts may be so synchronized that there will be little or no opportunity for breakage or other adverse occurrences; to provide such apparatus which is readily adjusted to accommodate different sizes of ampoules; to provide such apparatus which may be made in different forms; to provide such apparatus in which the upper portion of an ampoule is effectively removed and automatically discharged; to provide a novel ampoule engaging finger or hook, particularly useful in the apparatus of this invention; to provide such a hook which is particularly adapted to be utilized in connection with the type of ampoule in which a sealing section or second neck is disposed above the neck adapted to be broken for access to the contents; to provide a device for removing the upper end of an ampoule having straight sides above the neck; to provide such a device which is particularly adapted to be used in the apparatus of this invention; and to provide such apparatus which is economical and effective in operation. Additional objects and the novel features of this invention will become apparent from the description which follows.

In accordance with the novel apparatus of this invention, a plurality of containers formed of glass or the like and having material in the lower portion thereof, are sealed by passing a plurality of such containers in succession along a predetermined path, imparting to the containers a spinning motion about the longitudinal axis thereof, applying heat to a predetermined section of each container during spinning, such section being intermediate the ends thereof and also spaced from any material in the lower portion of the container, restraining axial movement of the lower portion of each container, continuously supporting the upper end of each container as the section being heated becomes softened, then exerting an axial pull to cause the upper portion of the container to be removed from the lower portion thereof, and preferably continuing the application of heat to form a relatively smooth seal at the separated section of the lower portion. The support of the upper end of each container during heating is highly desirable to prevent a "slumping" of the heated section, which tends to cause undue thickness, and also to prevent a "blow out."

In further accordance with this invention, the supporting step may include an axial pull, or "pre-pull" on the upper end of each container as the section being heated becomes softened, and the axial pull may then be relaxed, but not to the extent of relinquishing adequate support of the upper portion of the container. The "pre-pull," or axial pull on each ampoule after initial heating, may be sufficient in amount to cause a preliminary elongation of the heated section, to provide additional expansion space, although having a tendency to produce a thinner wall section, while the relaxation of the "pre-pull" permits the heated section to become slightly thicker, i. e., more nearly the thickness of adjacent wall portions. The "pre-pull" may be utilized to particular advantage in the case of containers having relatively wide stems, or whose stems are formed of relatively thick glass, to enable the portion to be sealed to be partially closed before final heating and separation. The "pre-pull" may be, while the final pull is preferably, accompanied by restraint of the tendency of the upper end of the container to spin.

The application of heat is preferably continued for a sufficient time after the upper section is removed, so that the point of severance will be melted down slightly to form a smooth, effectively sealed top or point at the upper end of the sealed ampoule. The method by use of the apparatus of this invention may also include the additional step of cooling, subsequent to final heating. Heating is conveniently accomplished by gas flames, and the length, temperature and other characteristics of the flames may be controlled by utilizing a mixture of fuel gas, and/or oxygen in varying proportions and at varying pressures.

Apparatus particularly adapted to carry out such a method is illustrated in the accompanying drawings, in which:

Fig. 3 is a partial transverse vertical section on a further enlarged scale, taken along line 3—3 of Fig. 2;

Fig. 4 is a partial horizontal plan view, taken along the line 4—4 of Fig. 2;

Fig. 5 is a top plan view, on an enlarged scale, of an ampoule engaging hook or finger forming a novel part of the apparatus;

Fig. 6 is a cross section of the hook, taken along line 6—6 of Fig. 5;

Fig. 7 is an elevation of one size of ampoule adapted to be sealed by the apparatus of this invention, and illustrating the manner of engagement of the hook of Fig. 5;

Figure 1:
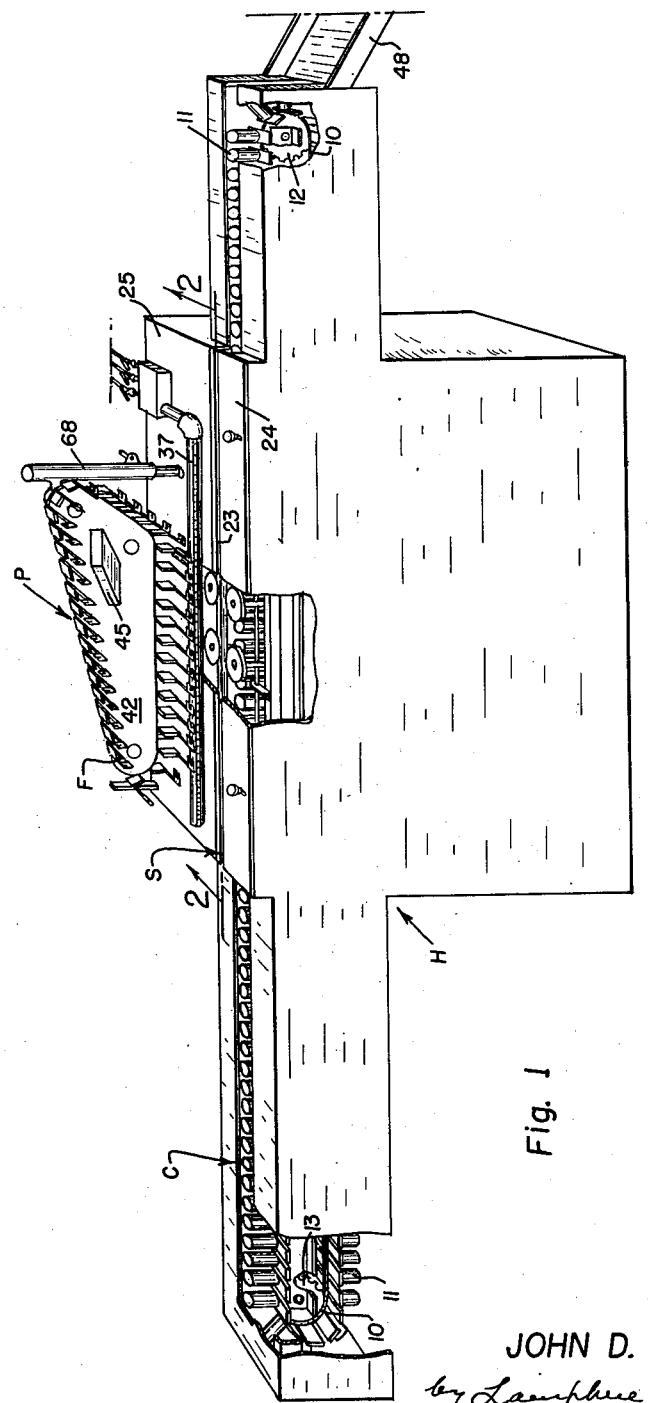
Fig. 1 is a three dimensional view of apparatus constructed in accordance with this invention.
Figure 2:
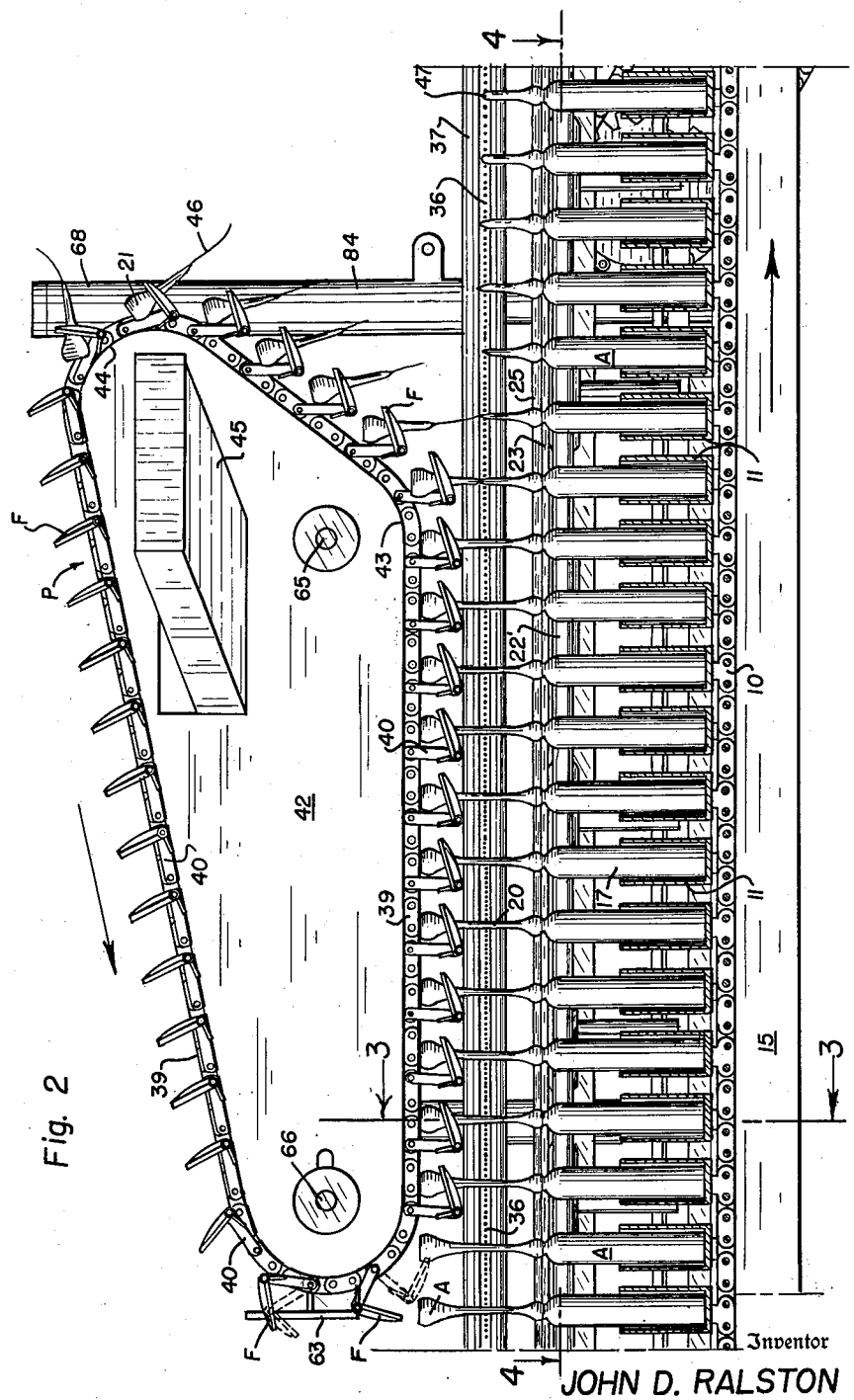
Fig. 2 is a partial longitudinal vertical section, on an enlarged scale, taken along line 2—2 of Fig. 1.
Figures 18, 19, 21:
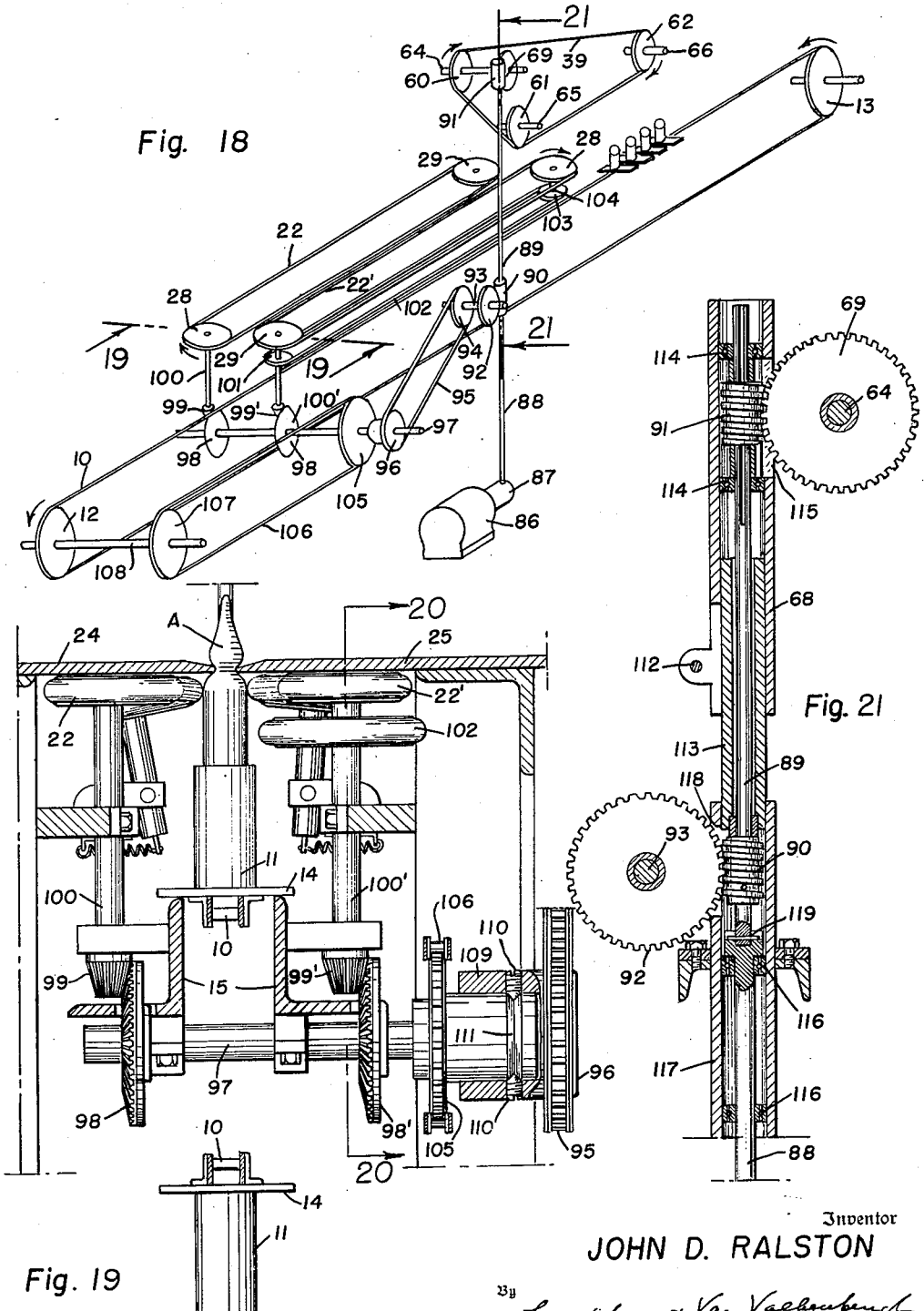
Figure 30:
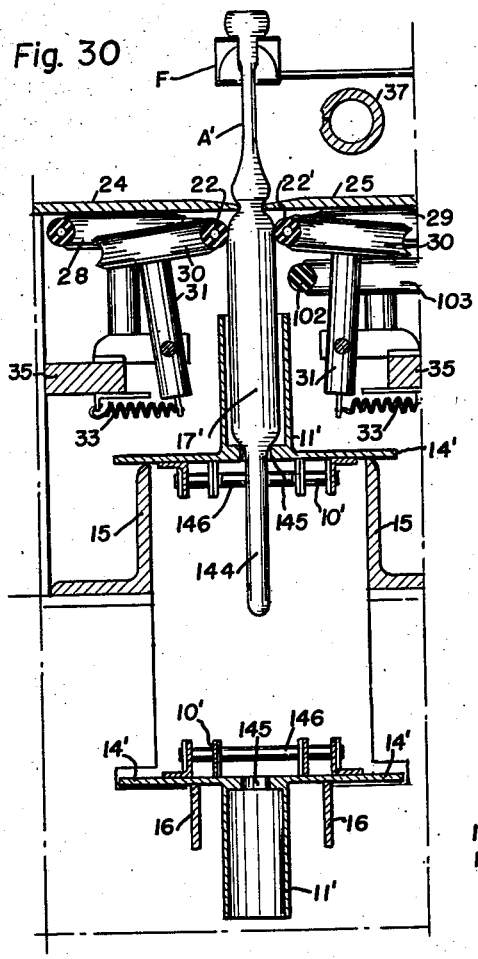
Figure 31:
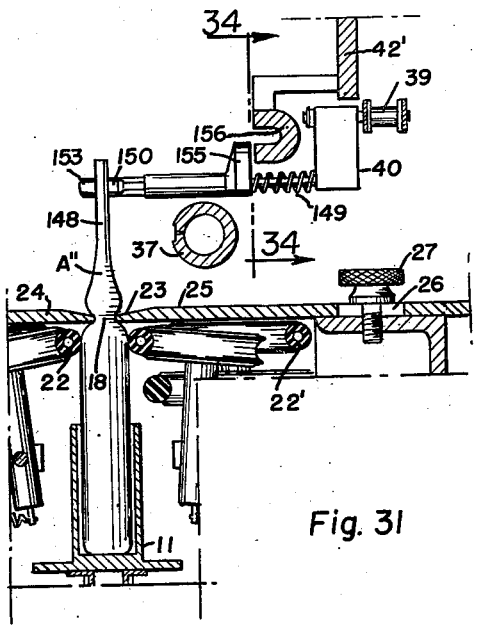
Figure 32:
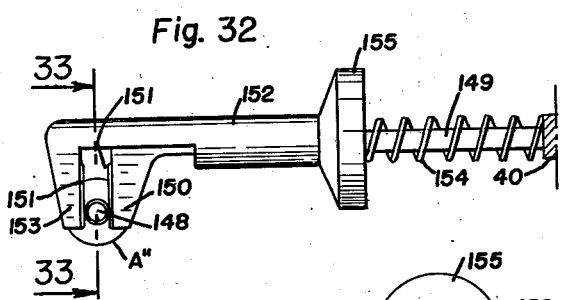
Figure 33:
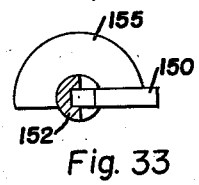
Figure 34:
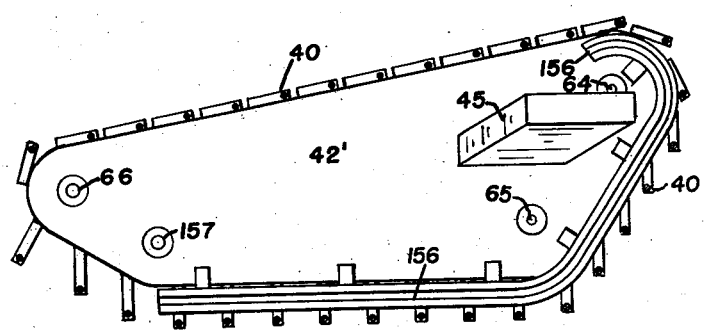
Figure 35:
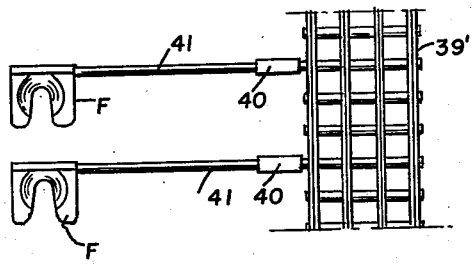
Figure 36:
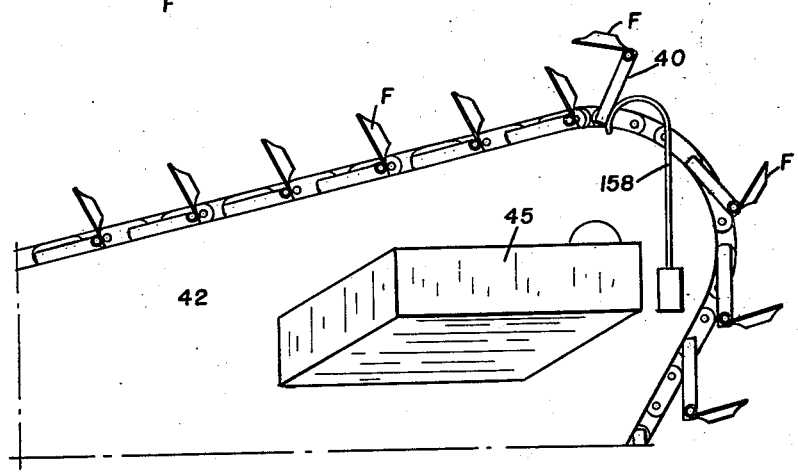
Figure 37:
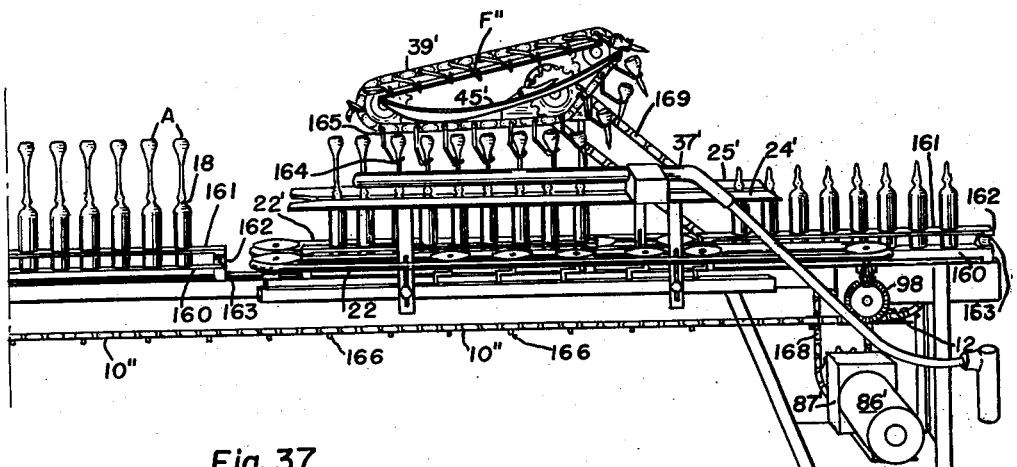

Figs. 8 to 11, inclusive, are similar elevations of other sizes of ampoules;

Fig. 12 is a perspective view of a modified form of ampoule engaging hook or finger;

Fig. 13 is an end elevation, partly in section and on an enlarged scale, of a cup of the apparatus of Fig. 1 provided with an adapter to accommodate the ampoule of Fig. 11;

Fig. 14 is a cross section taken along line 14—14 of Fig. 13;

Fig. 15 is a partial side elevation, on an enlarged scale, taken from the opposite side of the apparatus from which Fig. 2 is taken and illustrating a modification thereof;

Fig. 16 is a fragmentary horizontal section taken along line 16—16 of Fig. 15;

Fig. 17 is a fragmentary vertical section taken along line 17—17 of Fig. 15;

Fig. 18 is a three dimensional schematic illustration of the drive arrangement of the apparatus of Fig. 1;

Fig. 19 is a vertical section taken through a portion of the drive mechanism, at the position of line 19—19 of Fig. 18;

Fig. 20 is a fragmentary longitudinal vertical section taken along line 20—20 of Fig. 19;

Fig. 21 is a vertical section taken through a portion of the drive mechanism, at the position of line 21—21 of Fig. 18;

Fig. 22 is a fragmentary cross-section corresponding to the upper portion of Fig. 19, illustrating an alternative ampoule guiding and restraining strip or plate;

Fig. 23 is a similar fragmentary cross-section, illustrating another alternative ampoule guiding and restraining strip or plate;

Fig. 24 is a top plan view and partly schematic illustration of a heating assembly and flame control arrangement;

Fig. 25 is a cross section taken along line 25—25 of Fig. 24;

Fig. 26 is a fragmentary front elevation of the heating nozzles and orifices shown in Figs. 24 and 25;

Figs. 27 and 28 are orifice diagrams, illustrating alternative flame patterns;

Fig. 29 is a top plan view of a flame pipe and an air cooling pipe, the latter of which may be mounted on the apparatus of Fig. 1;

Fig. 30 is a fragmentary vertical section, illustrating a multiple type conveyor chain provided with cups adapted to accommodate relatively long containers;

Fig. 31 is a fragmentary vertical section, illustrating a magnetic gripping device which may be utilized in sealing plain top ampoules or the like;

Fig. 32 is an enlarged top plan view of the gripping device of Fig. 31;

Fig. 33 is a transverse section taken along line 33—33 of Fig. 32;

Fig. 34 is a side elevation of a pulling assembly utilizing the gripping device of Fig. 31, the gripping devices being in section along line 34—24 of Fig. 31;

Fig. 35 is a fragmentary top plan view of an alternative type of chain adapted to carry the ampoule engaging hooks;

Fig. 36 is a fragmentary side elevation illustrating an attachment for the apparatus, adapted to facilitate discharge of the tops of relatively small ampoules from the hooks;

Fig. 37 is a perspective view of a major portion of a machine alternative to that of Fig. 1;

Fig. 38 is a partial transverse vertical section, similar to Fig. 3, but illustrating an alternative carrier and spinning section;

Fig. 39 is a partial front elevation of a spinning and pressure element of Fig. 38;

Fig. 40 is an enlarged cross section of the spinning and pressure element;

Fig. 41 is a similar cross-section of an alternative spinning and pressure element;

Figs. 42 to 46, inclusive, are fragmentary vertical sections illustrating adjustment and variation of the carrier and spinning section of Fig. 38 to accommodate several different sizes of ampoules; and Figs. 47 to 49, inclusive, are top plan views of Figs. 42 to 44, respectively.

Apparatus constructed in accordance with this invention, as illustrated in Fig. 1, may comprise a conveyor C, mounted in a housing H and adapted to move a plurality of ampoules in succession through a spinning section S, above which is a pull assembly P, adjustable in position. The conveyor C includes an endless chain 10 to which a plurality of cups 11 are attached at spaced intervals and which passes over a drive sprocket 12 at one end and an idler sprocket 13 at the opposite end. Each cup 11, as in Fig. 3, may be mounted on a strip 14, which extends laterally to each side so as to rest on the tops of a pair of angles or upper guide bars 15, which support the chain and also maintain the cups 11 at a uniform elevation during the upper traverse of the chain, while the lower run of the chain may be supported by lower guide bars 16, on which the ends of strips 14 rest. Each cup 11, as in Fig. 3, is adapted to receive an ampoule A, shown also in Fig. 7, such as of the type having a lower or main body section 17 in which the medicinal or pharmaceutical, or other material, is contained, and directly thereabove a neck 18 which is adapted to be broken to obtain access to the contents of the ampoule. A bulge 19 above the neck 18 is adapted to be grasped by the user in breaking the neck 18, while an upper neck or elongated sealing section 20, of reduced cross sectional area, is adapted to be heated for severing and simultaneously sealing. Above the sealing section 20 is an enlarged top 21, which may be used as a guide in filling and also may be engaged by a finger or fork F of the pull assembly P of Fig. 1.

The spinning section S, as in Figs. 3 and 4, includes a pair of endless belts 22 and 22' which may be formed of rubber tubing or the like, and more preferably disposed in a horizontal plane, to engage the ampoules A on opposite sides during traverse of the inner portion of the paths thereof. Belts 22 and 22' are moved in the same direction, so that movement along the inner paths will be in opposite directions, so as to more effectively spin each ampoule A while in a cup 11. The outer belt 22, the ampoule engaging section of which is traveling in the same direction as the ampoules, is preferably moved at a considerably greater speed than the inner belt 22', the ampoule engaging section of which is traveling in the opposite direction to the direction of movement of the ampoules. In general, the different speeds of the belts may be proportioned in accordance with the following formulae, the speeds or velocities indicated being expressed in terms of ft. per sec., ft. per min., etc.

$$V_f = V_1 + V_2$$

and $$V_r = V_1 - V_2$$

where:

$V_f$=Speed of front belt 22
$V_r$=Speed or rear belt 22'
$V_1$=Speed of conveyor C, and
$V_2$=Peripheral speed of rotating ampoules As the ampoules A are moved along by the conveyor C, each begins to spin as it reaches the spinning section S, and continues spinning until it leaves the spinning section. At the same time, beveled edges 23 of oppositely disposed, horizontal guide plates 24 and 25 engage a neck 18 of each ampoule A, as in Fig. 3, the plates 24 and 25 being provided with slots 26 and adjustable by means of thumb screws 27, so as to leave sufficient clearance for rotation or spinning, but prevent axial movement of the ampoules. The plates 24 and 25 comprise one form of means for restraining axial movement of the lower portion of each ampoule, although other forms may be utilized, such as described later.

The opposite ends of each endless belt 22 and 22', as in Fig. 4, pass around a drive roller 28 and an idler roller 29, which are respectively disposed at opposite ends of the spinning sections, the drive roller 28 for belt 22 being disposed at the opposite end of the spinning section S from the drive roller 28 for belt 22', so that each belt will be pulled along the ampoules, rather than pushed. In addition, during travel along the inner portion of its path, each endless belt is pressed inwardly by a plurality of pressure rollers 30, which force the belts against the ampoules. Each pressure roller 30, as in Fig. 3, may be mounted for free rotation on the upper end of a post 31, which in turn is pivoted on a pin 32 adjacent the lower end thereof, while a spring 33 may be connected to the lower end of each post 31 to urge the pressure roller 30 inwardly to press the belt 22 or 22' against the ampoules A. The pins 32 for posts 31 may be mounted individually, or may comprise a single rod, as in Figs. 4 and 15, extending longitudinally between brackets 34, the latter in turn being mounted in a convenient manner, as on a longitudinal bar 35, to the underside of which the springs 33 may also be attached, as in Fig. 3. The bars 35 may conveniently form a portion of the framework of housing H.

As each ampoule A travels along the spinning section S, the elongated sealing section 20 thereof is heated, as by a series of heating gas flames discharged from orifices 36 in a flame pipe 37, as in Figs. 2 and 3, or orifices 36', in a series of nozzles 38, as in Figs. 24–26, which will be described later. The heating flames are preferably adjusted so as to produce the desired amount of heat as the ampoules move along, depending upon the diameter and wall thickness of the sealing section 20 of the ampoules, variation in the heating effect of the flames being obtained, when desired or necessary, in any suitable manner, such as by mixing combustible gases of different B. t. u. content, or by using a gas such as propane, butane or the like, and varying the amount of oxygen available for combustion, as by varying the amount of oxygen in an oxygen enriched air supply. Also, as the ampoules move along the spinning section S, the top of each ampoule is engaged, and then removed, by the finger F of the pull assembly P, as in Fig. 2. Each finger F is moved around a closed path, preferably in a vertical plane, by an endless chain 39, on which a plurality of links or blocks 40, as in Figs. 2 and 3, are pivotally mounted, one for each finger F, and each of which also carries a laterally extending rod 41, on the outer end of which a finger F is mounted. The chain 39 may move around the edge of a vertical plate 42, which may correspond in shape generally to an obtuse triangle, with arcuate corners, the front lower point 43 thereof being the start of an upward movement of the fingers F which removes the upper ends of the ampoules A. The blocks 40 ride along the upper edge of plate 42, and the rounded, upper front corner 44 of the plate tips the fingers by engagement with blocks 40, for discharge of the removed ampoule tops 21 into a discharge chute 45. The fingers F are preferably made of heat resistant material, such as stainless steel, while the guide plates 24 and 25 also tend to protect the spinning belts 22 and 22' from the effect of the heating flames. As in Figs. 1 and 2, the center of gravity of the assembly which includes a finger F, a rod 41 and a block 40, is preferably such that as the chain 39 passes along the lower portion of its path of traverse, the blocks 40, which, of course, are spaced laterally from the ampoules A, will hang slightly to the rear, and the fingers F are preferably mounted on the rods 41 so that the front end of each finger will be tipped slightly upwardly.

The speed of the conveyor C and the heating effect of the flames are preferably so correlated that as the ampoules move along, as in Fig. 2, the glass of the sealing section 20 of each ampoule will become soft, such as when the ampoule reaches about the midpoint of the spinning section S, so that when point 43 is reached, the top of the ampoule may be pulled off, a fiber 46 of glass usually being pulled off along with the top 21, which drops from the finger F into discharge chute 45. The remainder of the sealing section of the ampoule, or the top of the ampoule after the original top has been removed, may be still exposed to the heating flames, and thus melted down into a smooth, rounded top 47 of Fig. 2. After sealing, the ampoules may be carried by the conveyor C to a point of discharge, such as into a discharge chute or trough 48 of Fig. 1, which may have a bottom of canvas or the like and along which the sealed ampoules may slide to a container or a conveyor to be carried to a suitable place for packing. If desired, a cooling jet, as of air, may follow the heating flames, as will be described later.

It will be evident, of course, that the plates 24 and 25 will restrain the lower portion of each ampoule from axial movement, while permitting spinning by belts 22 and 22', and the fingers F will support the upper ends of the ampoules during heating, thus preventing any sagging or undue thickening of the heated section. Also, the fingers F will tend to restrain rotation of the upper ends of the ampoules, and after the point 44 is reached, will prevent rotation, thereby causing the heated section to be twisted off as well as pulled. Such twisting tends to cause the separating section of glass to coalesce, to produce separation along a solid, rather than a hollow section of glass, and thereby prevent the formation of microscopic channels. Also, the upward pull will cause fiber 46 to come off with the top 21, so that the top 47 of the lower portion of the ampoule will not be unduly thick.

In some instances, it will be desirable to use a "pre-pull" in which heat is applied so that the glass will be sufficiently softened, as at about the midpoint of the lower path of travel of the fingers F, at which time a slight upward pull on the top of the ampoule can be made by the finger F, so as to produce a slight elongation and narrower section. The upward pull on the ampoule is then slightly released, the section then becoming slightly thicker, after which the top of the ampoule is pulled off in the manner described above. For such method, the sealing section 20 of each ampoule is preferably heated at an appropriate rate, so that when the "pre-pull" position is reached, the glass at the heated section will have become sufficiently soft to permit gently increased tension to partial pulling, without the danger of cracking or otherwise damaging the glass, although it may or may not be molten until the final pull position is reached. Dependent upon the amount of heating and the relative resistance to torsion at the heated section, when each ampoule reaches the "pre-pull" position, the fingers F may sufficiently prevent rotation or spinning of the top of the ampoule, so that when the sealing section is narrowed, it will be completely closed, or substantially so and twisted. Thus, when the "pre-pull" is released, the section which settles may be a substantially solid section, and when the final pull is made, the ampoule will be separated along a solid section. Or, the amount of heating of the sealing section prior to the "pre-pull" may be sufficient to cause the heated portion to coalesce and run together, so that the function of the "pre-pull" may be primarily to expand the lower portion of the ampoule, so that air or gas above the contents in the lower portion of the ampoule, upon expansion due to heating, will not tend to distend the softened glass, and form a small blow hole or the like. As is well known, glass when molten or nearly so, is very weak and pliable, and only a slight amount of air or gas pressure may be sufficient to bubble through, as it were.

Each of the fingers F may be specially constructed, so as to engage a variety of sizes of ampoules. For instance, as in Figs. 5 and 6, each finger F may have at the rear end a curled lip 49 adapted to be clamped onto rod 41, as in Fig. 3, while a broad, V-shaped slot 50 may extend from the front of the finger back to an arcuate central hole 51. In addition, the central portion of the finger may be stamped or otherwise formed to provide a well or depression 52 having downwardly and inwardly extending sides, in the center of which the hole 51 is drilled, punched, or otherwise suitably formed and a portion of which is removed when slot 50 is formed. The shape and configuration of the well or depression 52, as well as the extent of slot 50 and central hole 51, enables each finger to slide readily into position and then exert an upward pull on the upper end of the ampoule during sealing and removal of such upper end. The well or depression 52 also contributes to the successful discharge of the removed upper portion of the ampoule, as when the finger F is tipped to the position shown at the upper right in Fig. 2. A strip or rest 53 may be attached to the lip 49, to assist in discharge of the severed tops of relatively large ampoules, the purpose of the strip 53 being to prevent the tops from falling out prematurely, prior to discharge into chute 45, because of top heaviness. The strip 53 may be omitted, if desired, as in the case of the fingers F shown in Fig. 2.

In Figs. 7 to 11, inclusive, a number of sizes of ampoules are shown, and the probable relative points of engagement of the fingers F are also indicated. The ampoule A shown in Fig. 7 is illustrative of a 30 c. c. ampoule, i. e. one adapted to hold 30 c. c. of a liquid medicinal or pharmaceutical in the lower or body portion 17; that of Fig. 8 is illustrative of a 15 c. c. ampoule; that of Fig. 9 is illustrative of a 7 c. c. ampoule; that of Fig. 10 is illustrative of a 3 c. c. ampoule; and that of Fig. 11 is illustrative of a 2 c. c. ampoule. As will be evident from Figs. 7 to 11, each size of ampoule shown may be passed through the spinning section with the neck 18, 18a, 18b, 18c or 18d, respectively, between the edges 23 of the guide plates 24 and 25 of Fig. 3, which guide plates may remain at the same elevation, being adjusted slightly inwardly or outwardly to accommodate different neck diameters. Also, the fingers F are adapted to engage the enlarged upper ends 21, 21a, 21b, 21c or 21d, respectively, of the various ampoules at substantially the same elevation, very little adjustment, if any, being necessary to shift from one to the other of the ampoules of Figs. 7 to 9 and 11, although the ampoule of Fig. 10 may require a greater amount of adjustment of the pulling assembly P. Of course, if the machine is operated on a standardized line of ampoules, for instance, which are specially made so that the fingers F will engage the upper end at exactly the same elevation for each, then substantially no adjustment therefor of the pulling assembly P is necessary.

It may sometimes happen that the dimensions of the upper ends of the ampoules, for a particular size, may vary somewhat, particularly along the tapering portion below the point of largest diameter. Often, the point of largest diameter has been found to tend to be more nearly uniform, so that the center hole 51 of the finger F of Figs. 5 and 6 may be made larger, or a slightly different finger, such as the finger F' of Fig. 12, may be used, although in either case, the nominal sizes on which such a finger may be utilized will be reduced to perhaps two or three. As in Fig. 12, the finger F', which may be mounted on a rod 41, by a rear lip 49, as before, is generally flat and provided with a center hole 51', which extends to the front edge but is slightly greater than 180° in extent. In a manner explained later, such a finger may be moved to a lower position at the beginning of the lower path of traverse, so as to pass around the stem, and then moved upwardly to engage the bulge of the upper end of the ampoule. Or, the finger may be turned as it engages the ampoules, so that the restricted portion of the hole 51' may move across a lower and therefore smaller portion of the ampoule stem.

The cups 11, mounted on the endless chain 10 of the conveyor C, as in Figs. 1 to 4, are preferably of sufficient diameter to accommodate the largest size of ampoule or container which the machine is to seal, such as the ampoule of Fig. 7. The upper ends of the cups may, if desired, be outwardly flared to facilitate insertion of the ampoules. When smaller ampoules are to be carried by the conveyor C, an attachment may be inserted in each of the cups 11, such as the attachment 54 of Figs. 13 and 14, particularly adapted to receive the ampoule of Fig. 11. The attachment 54 may be generally cylindrical, being adapted to fit into the cup 11 and having a flange 55 resting on the top of cup 11 and a well 56 in which the ampoule is placed, the diameter of the well 56 preferably being such that the ampoule will readily spin, yet will have no tendency to become dislodged or misaligned. To retain the attachments 54 in each of the cups 11, the body of the attachment may be provided with an annular groove 57 into which one end of a spring clip 58 is adapted to fit, as by one end being bent and extending through a slot in the side wall of cup 11, adjacent the top thereof. To accommodate other sizes of ampoules, such as those of Figs. 8 to 10, attachments having wells of an appropriate size, adapted to fit within the cup 11, and to be held therein in a suitable manner, as by the spring clip 58, may be provided for each different size of ampoule to be sealed. It will be understood, of course, that cups which are variable in size, or detachable cups for the various sized ampoules, such as cylinders having a threaded peg at the bottom and adapted to engage a corresponding threaded hole in the strip 14, may also be utilized. Also, cups adjustable in size to accommodate various sizes of ampoules may be provided.

In the pull assembly P, as in Fig. 15, the path of the endless chain 39, which moves the forks F around the desired path, may be determined generally by an upper sprocket 60, a lower sprocket 61 and an end sprocket 62, the chain being moved in the direction of the arrows of Figs. 2 and 15. As the chain 39 moves the fingers F around, the blocks 40 follow the periphery of plate 42, which, as indicated previously, is preferably so shaped that as the chain 39 passes around the upper sprocket 60, each block 40 will, in turn, be tipped upwardly, so that the previously removed upper portions of the ampoules fall from the fingers F into chute 45, which may extend through the plate 42 to a suitable waste receptacle, or the like. As also indicated previously, as the chain 39 moves between the upper sprocket 60 and the end sprocket 62, shown in Fig. 15, the blocks 40 will lie back and ride along the upper edge of the plate 42, as in Fig. 2. As the chain 39 passes around the end sprocket 62, the blocks 40 will tend to pivot and swing downwardly to a lower position, and to prevent a finger F from hitting the top of an ampoule, a guide strip 63, as in Fig. 2, may be mounted in position to engage the corresponding block 40, so that as one of the fingers F tends to fall outwardly, it will fall only to the upper dotted position of Fig. 2, and the block 40 will ride down along the guide strip 63, until the lower end of the guide strip is reached. At that time, the block 40 is released, and the finger F will swing to the lower dotted position, so as to fall into the space between two ampoules, and thence into engagement with the ampoule A just ahead. The speed of movement of chain 39 is, of course, synchronized with the speed of movement of chain 10 so that the fingers and the ampoules will travel along at the same rate.

The sprockets 60, 61 and 62 for the endless chain 39 of the pull assembly P may each be mounted, as in Figs. 15 and 16, on shafts 64, 65 and 66, respectively, which shafts also support the plate 42, and are shown in Fig. 2. The shaft 64 for the upper sprocket 60, which also may be the drive sprocket, may be mounted on an arm 67 which extends laterally from a vertically adjustable, tubular housing 68, by which the forward end of pull assembly P may be adjusted vertically, while shaft 64 may carry a worm gear 69, for driving sprocket 60. Shafts 65 and 66, for the lower and end sprockets 61 and 62, respectively, may be mounted on a suitable support, such as an irregularly shaped bar 70, the upper end of which may be pivotally mounted on shaft 64. Bar 70 extends angularly downwardly past shaft 65, to a lower horizontal section 71, then slightly upwardly and rearwardly to shaft 66 for end sprocket 62. As in Fig. 16, the end sprocket 62 is adjustable along bar 70, as through a bolt 72 extending through shaft 66 and also through a slot 73 in bar 70, a corresponding slot 73' being formed in plate 42, as also shown in Fig. 2, through which bolt 72 extends. Guide strip 63 may be supported from the end of bar 70, as by an arm 74 mounted thereon. Just forward of the end sprocket 62, as in Figs. 15 and 16, bar 70 may be supported by a pivot pin 75 mounted in the forked upper end of a vertical rod 76, the lower end of which extends through a clamp 77, by which the vertical position of the rear end of the pull assembly P may be adjusted.

The position of the sprocket 61 determines the point at which the finger F will begin the rise at "pull-off," and the comparative elevation of sprockets 61 and 62 will determine the angular relation, if any, between the lower path of traverse of chain 39 and the path of movement of the ampoules. The sprockets 61 and 62 may be at substantially the same elevation, so that the lower path of traverse of the chain 39 will be parallel to the path of movement of the ampoules, as in Fig. 2, or a slight rise may take place between sprockets 62 and 61. When the finger F' of Fig. 12 is utilized, the guide bar 63 may be adjusted so that the desired swing of the finger is obtained, or sprocket 62 may be set lower, and a pinion (not shown) placed just ahead of sprocket 62 to raise chain 39 shortly thereafter. Or, a slight rise may be obtained by positioning a sprocket 78, shown in Fig. 15 in use as a "prepull" sprocket, relatively close to sprocket 62.

As described previously, the "pre-pull" may be imposed after the neck 20 of the ampoule has become softened, and may be obtained by passage of chain 39 over a "pre-pull" sprocket 78, as shown in Figs. 15 and 17, which produces a slight elevation in the path of traverse of the chain 39 as it passes thereover. A balancing sprocket 79 may also engage chain 39 from above to press the chain downwardly against the "pre-pull" sprocket, so that the path of chain 39 between end sprocket 62 and the "pre-pull" position may be made horizontal. As in Fig. 17, the balancing sprocket 79 may engage the top of chain 39 to the inside of the "pre-pull" sprocket 78, so as to more adequately maintain chain 39, and particularly the rods 41 and fingers F, in horizontal position. The sprockets 78 and 79 are suitably mounted for adjustment, as on a bar 80 provided with a slot 81, through which slot a bolt 82 or other suitable clamping device may pass, to permit adjustment of the relationship between the sprockets 78 and 79, as well as the vertical position of "pre-pull" sprocket 78. A slot 83 in the horizontal section 71 of bar 70 permits the longitudinal position of the bar 80, and sprockets 78 and 79 with it, to be adjusted as desired. Thus, the sprockets 78 and 79, through bar 80, may be adjusted, as from the full to the dotted position of Fig. 15, and also to other positions.

In order to move each finger F' of Fig. 12 to a lower position, so as to pass around the stem, and then upwardly to engage the bulge at the upper end of the ampoule, the sprockets 78 and 79 may be positioned closely adjacent the sprocket 62, which latter may be positioned lower than shown. Thus, in passing around sprocket 62, the fingers F' will be moved to a lower position, while the chain in passing around sprocket 78 will move the fingers sharply upwardly so that each will in turn engage the bulge at the upper end of the respective ampoule. The upper end of sprocket 78, is, in such a case, preferably at a desired height to maintain the chain along the desired path of traverse between this point and the "pull" sprocket 61.

As also shown in Fig. 15, the flame pipe 37 may be mounted for vertical and angular adjustment, as by an angular supporting rod 84 therefor extending through a clamp 85, which may be loosened to adjust the pipe 37, and then tightened to maintain the pipe in adjusted position. Both clamp 85, for flame pipe 37, and clamp 77 for pull assembly P, may be mounted on the framework of housing H.

A suitable drive arrangement for the conveyor C, the belts 22 and 22' of spinning section S, and the endless chain 39 of the pull assembly P, may be constructed in the manner illustrated diagrammatically in Fig. 18. All of the moving parts may be driven from a single drive motor 86, mounted within the housing H of Fig. 1, and provided with a speed reducer 87 which drives a lower vertical shaft 88, releasably connected with an upper shaft 89 on which a lower worm 90 is mounted. An upper worm 91 on shaft 89 engages worm gear 69, mounted on shaft 64 of sprocket 60, thereby driving the chain 39. The lower worm 90 engages a worm gear 92, mounted on a transverse shaft 93, which carries a sprocket 94 adapted to drive, by means of a chain 95, a coupling sprocket 96. The coupling sprocket 96 is adapted to rotate a transverse shaft 97 on which are mounted bevel gears 98, in turn engaging bevel pinions 99 and 99'. Pinion 99 is mounted on the lower end of a vertical shaft 100, on which is mounted the drive roller 28 for the endless belt 22, while pinion 99' is mounted on the lower end of a vertical shaft 100', on the upper end of which idler pulley 29 for belt 22' may be journaled and which carries in an intermediate position a pulley 101, as in Fig. 20. Through a drive belt 102, pulley 101 is connected with a pulley 103 on drive shaft 104 for pulley 28 for belt 22', so that each belt 22 and 22' will be pulled along the ampoules. The pulleys 101 and 103 may differ in diameter, to produce the difference in speeds of belts 22 and 22', as when determined by the formulae previously given. As in Figs. 18 and 19, the bevel gears 98, 98' preferably face to the same side, so that the drive rollers 28 for the endless belts 22 and 22' will be rotated in the same direction, but cause the endless belts 22 and 22' to move past the ampoules in opposite directions, as described previously.

Through a sprocket 105 mounted thereon, transverse shaft 97 also drives endless chain 10 of the conveyor C, by means of a chain 106 which passes around sprocket 105 and also around a sprocket 107 mounted on a shaft 108 of the drive sprocket 12 for chain 10. As shown in Fig. 19, the coupling sprocket 96 may be provided with a flange 109 having one or more pointed set screws 110 adapted to engage a V-groove 111 in transverse shaft 97, so that the position of the cups 11 of the conveyor C may be synchronized exactly with the position of the fingers F on the endless chain 39 of the pull assembly. Such adjustment may be accomplished by loosening the set screws 110, moving the chain 10 to a desired position, and then tightening the set screws.

The vertically adjustable housing 68, as in Fig. 21, may be split at its lower end and provided with a clamping screw 112, as also shown in Fig. 15, the lower split end of the housing 68 being adapted to enclose the upper end of a tubular post 113 and to be adjusted upwardly and downwardly along the same. To accommodate this upward and downward adjustment, the upper end of shaft 89 may be splined, for movement of worm 91 therealong, a ball bearing 114 being suitably provided above and below the worm 91, as at the upper and lower ends of a slot 115 in housing 68, through which worm gear 69 is adapted to extend, to engage the worm 91. The lower shaft 88 may also be mounted in ball bearings 116, in a lower tube 117 which is provided with a slot 118, through which worm gear 92 is adapted to extend, to engage worm 90. A disengageable coupling is preferably formed between the shafts 88 and 89, as by a pin 119 on shaft 89, adapted to engage transverse slots in the upper end of shaft 88. By means of the disengageable coupling between the shafts 88 and 89, the entire pull assembly P may be removed, if desired, by lifting the post 113, shaft 89 and worm 90 with the pull assembly. As will be evident, other and equally suitable constructions for transmitting the desired power from a drive motor or the like to the various chains and spinning belts may be utilized.

It may sometimes occur that the vertical position or diameter of neck 18 of a large number, such as several thousand or more, of ampoules of the same nominal size may vary to the extent that spinning is retarded or—of more concern—the engagement by the fingers F during heating may tend to break the ampoules, as by too great a pull or support of the upper ends of the ampoules. The guide plates 24 and 25 are, of course, relatively inflexible, but are satisfactory for ampoules within certain tolerances. However, when such tolerances are exceeded, particularly in the position or diameter of neck 18, flexible guide plates similar to those shown in Figs. 22 and 23 may be utilized. The guide plates 124 and 125 of Fig. 22 are provided with flexible strips 122, which extend into contact with the necks 18 of the ampoules A, but over a flange 123 at the inner edge of each plate 124 and 125. Strips 122 may be attached to the plates at points spaced from flanges 123, as by screws 126, so that the strips will adequately restrain the lower portion of the ampoule from vertical movement, yet can be moved slightly apart, or upwardly, to accommodate variations in diameter or vertical position of neck 18.

The construction of Fig. 22 is perhaps more flexible with respect to variation in vertical position of the neck 18, and when considerable variation in diameter thereof is encountered, the construction of Fig. 23 may be utilized. As shown therein, side plates 24' and 25' may terminate short of the ampoule, with a flexible strip 122' mounted for sliding lateral movement, against a series of springs 127. The slides may be formed by the flexible strips 122', which may be disposed below the plates 24' and 25', as shown, or above the same, and narrow strips 128, held together against spacing strips 129 by screws 130, may be spaced a few inches apart along the plates, and connected to screws 130 by tension strips 131, the opposite ends of the springs being attached to ears or projections 132, mounted on or otherwise formed to extend from plates 24' and 25'. As will be evident, the strips 122' can move inwardly or outwardly readily to accommodate variations in diameter of neck 18, and can also flex or bend to accommodate variations in position of the necks.

It will be evident that the flexible strips 122 of Fig. 22 can be used on one side of the ampoules, and the strips 122' and slide arrangement of Fig. 23 can be used on the opposite side. Also, the "flexible" guide strips may be placed along the entire length of the heating section, or only a portion thereof, as warranted by conditions, and when the variation is primarily in the diameter of the necks 18, a sliding guide strip, as in Fig. 23, may be utilized on one side only.

To provide the desired temperature and other characteristics of the heating flames, a construction similar to that illustrated in Fig. 24 may be utilized, wherein an air pipe 130, an oxygen pipe 131 and a fuel gas pipe 132—the flow through each being controlled by a separate valve 133—lead to a manifold 134, in which a mixture of air and fuel gas, or oxygen enriched air and fuel gas, or, if desired, oxygen and fuel gas, is made. The mixture passes through a flexible hose or tube 135 to one end of the flame pipe 37, for delivery to nozzles 38 and discharge through orifices 36', as in Fig. 26. The right angle post 84, as indicated previously, is adjustable vertically by means of clamp 85, while the laterally extending end of post 84 may be provided with a friction clamp 136, adapted to hold the pipe 37' in a satisfactory position, by permitting the pipe to be moved to any desired longitudinal position.

It will be evident, of course, that other ways of forming and/or adjusting the heating flames, as well as positioning the same, may be utilized. The heating flames may be discharged through orifices which are equally spaced in a single longitudinal row, such as orifices 36 of Fig. 2, or in other and different relationships, such as illustrated in Figs. 27 and 28. For instance, as in Fig. 27, some of the orifices may be disposed in pipe 38' in a double row, such as orifices 36'', both before and after orifices 36 disposed in a single row, so that a double row of orifices 36'' will be provided during initial heating and also during the final pull, with a single row of orifices 36 being positioned between initial heating and the beginning of the final pull, and also for melting down the severed end and completing sealing. Again, as in Fig. 28, a triple, staggered row of orifices 36''' may be positioned to heat initially, with a single row of orifices 36 following until the beginning of the final pull, at which time a double row of orifices 36'' provide heat, and after which another single row of orifices 36 provide heat for melting down and completion of the sealing. When a "pre-pull" is utilized, the initial heating may continue through pre-pull, while similar orifice patterns may be made in the nozzles 38 of Figs. 24–26. Although a number of variations in flame pattern have been shown, it will be evident that different flame patterns may be utilized, in accordance with specific heating requirements.

It may sometimes happen that the sealed upper ends of the completed ampoules are not sufficiently cool, immediately after passage beyond the heating flames, to permit handling as soon as desired. In such instance, a jet or series of jets of air or other gas, which may be warmed, can be directed against the sealed ends, to cool the same down to a temperature at which handling is convenient. As in Fig. 29, an air pipe 138 may be positioned in longitudinal alignment with the flame pipe 37, the air pipe 138 being supplied with air or other desired cooling medium through a flexible hose or tube 139. Similar to the flame pipe 37, the air pipe 138 may be adjustable longitudinally by a friction clamp 140 provided on a right angle post 141, which in turn is adjustable vertically through a clamp 142. As will be evident, a gas other than air may be utilized for cooling, and the temperature of the air or gas may be varied in accordance with the rate of cooling desired. Also, the orifices in the pipe 138, through which such air is discharged, may be disposed in a single row, or may be disposed in different or varying patterns, as discussed above in connection with the flame orifices. Or, the air may be discharged through nozzles or a longitudinal slit or slot in the air pipe 138, which also may direct the air angularly downwardly, or upwardly, as desired.

As will be evident, numerous variations may be made in the apparatus as previously described. For instance, the cups adapted to receive the ampoules may be constructed, such as in the manner of the cup 11' of Fig. 30, to accommodate an ampoule A' having a lower or main body section 17' provided with a lower extension 144. To accommodate such as ampoule, the cup 11' is provided with a hole 145 which also extends through strip 14', through which hole the ampoule extension 144 is adapted to extend. The ampoule extension 144 also extends through the chain 10', which for the purpose may be a double or triple chain, such as a relatively wide chain having a relatively wide span between links, or may be formed, in effect, by two spaced chains connected together by central pins 146. For the chain 10', a pair of sprockets is preferably provided at each end, the sprockets being side by side. However, the upper guide bars 15 and lower guide bars 16 for the strips 14', and also the ampoule guide plates 24 and 25, the flame pipe 37, and the fingers F, as well as other parts associated with the same, may be constructed in the various ways described previously.

Certain types of ampoules are not provided with the upper enlargement or filling guide 21, such as the ampoules A and A' of Figs. 7 and 30, respectively, but instead, as in the case of the ampoule A'' of Figs. 31 and 32, the upper end 148 is cylindrical or straight. In order to effectively seal ampoules of this type, it is necessary to grasp the upper end 148, rather than merely inserting a finger or hook beneath the filling guide cup. A modification of the apparatus previously described, particularly adapted to seal ampoules of this type, is illustrated in Figs. 31 to 34. Such apparatus may include a conveyor having cups 11, a spinning section including endless belts 22 and 22', and guide plates 24 and 25, between the edges 23 of which the neck 18 of the ampoule is adapted to fit. The pull assembly may include an endless chain 39 and a drive therefor, as well as spaced blocks 40 and a top discharge chute 45, as before, but has a special device for gripping and releasing the top 148 of each ampoule. Each such special device, as in Figs. 31–33, may include a laterally extending rod 149 which is mounted at its inner end on block 40 and provided at its outer end with a jaw 150 having a block 151 of heat resistant material, such as silicone rubber. A slide 152 having a jaw 153 at its outer end, also provided with a block 151 of heat resistant material, is normally pressed outwardly by a spring 154, which may bear against a relatively heavy flange 155 at the inner end of slide 152 and which also preferably extends upwardly from the rod 139, as in Fig. 31. The slide 152 and rod 149, together with their jaws 150 and 153, are preferably made of heat resistant material, such as stainless steel or the like, but the flange 155 is made of magnetic material. Thus, as in Figs. 31 and 34, when the flange 155 comes within the field of attraction of a magnet 156, the jaw 153 of slide 152 will close toward jaw 150, thereby clamping the upper end 148 of the ampoule A'' between the blocks 151, which are adapted to clamp the glass without breaking or cracking it. The spring 154 is preferably relatively weak, inasmuch as very little force is necessary to force the slide 152 outwardly and the jaws 150 and 153 apart when there is no pull by magnet 156 on flange 155. However, magnet 156 is preferably a relatively strong permanent magnet, as shown, or an electro-magnet, which is adapted to produce sufficient pressure between the jaws to cause the upper end 148 of the ampoule to be clamped securely. As in Fig. 34, the extent of magnet 156 is such that, as soon as the end of the magnet is reached, the spring 154 will produce a separation of the jaws and cause the removed upper ends of the ampoules to be dropped into chute 45, in a manner similar to that previously described.

In order to cause the fingers to slide down over the ampoule stems, before closing on them, the path of travel of the fingers may be slightly different, as in Fig. 34. The plate 42' may be cut away at the lower rear, and the various sprockets, as represented by their shafts 64, 65 and 66, respectively, may be positioned somewhat as before, except that the rear sprocket, on shaft 66, may be higher than previously. Also, an additional sprocket, mounted on a shaft 157, may be placed above the start of magnet 156, to maintain the chain and fingers along the desired lower traverse path.

When greater stability of the endless chain adapted to carry the fingers F around is desired, a chain 39', of Fig. 35, may be utilized, which is a compound chain, such as having what may be termed triple pins, adapted to be supported and driven by spaced pairs of sprockets, a pair of sprockets being placed at the position of each of the sprockets 60, 61 and 62 of Fig. 13, or at other desired positions. With such a chain, the "pre-pull" sprockets, when used, may be disposed in laterally spaced relation, to increase stability, or may engage the same longitudinal section of the chain.

It may sometimes happen, particularly in the case of relatively small ampoules, such as those of Figs. 10 and 11, that the tops of the ampoules, after the removal, tend to tip backwardly in the fingers F, and instead of discharging into the chute 45, as in Fig. 2, tend to be carried along the upper path of traverse of the fingers, and thus to discharge as the fingers swing around the end sprocket 62 of Fig. 15. In such a case, each finger F may be tipped upwardly, to a higher position, such as to the position of the uppermost finger of Fig. 36, the finger thus being almost upside down, so that the discharge of the removed end of the ampoule is insured. For tipping the fingers to such a position, a cam may be utilized, or a leaf spring 158, which may be mounted on plate 42 and is adapted to engage each block 40 in turn, as it approaches a position above the chute 45, the upper end of the leaf spring 158 being arcuate or having any other suitable curvature or configuration, so that the spring will tend to be bent forward as it is engaged by block 40, but as the block passes over the spring, it will be raised to the upper position shown. After discharge of the removed end of the ampoule, and passage beyond spring 158, each block 40 and finger F will drop back, to assume a more normal position during passage along the upper edge of guide plate 42.

In the operation of the apparatus previously described, involving a series of cups 11 or 11' mounted on an endless chain 10 or 10', the ampoules are placed individually in the cups. A satisfactory way of filling the ampoules and placing them in the cups is by means of one or more operators utilizing filling valves constructed in accordance with my copending application Ser. No. 60,925, filed November 19, 1948, and entitled "Valves," an outstanding advantage of which is the ability of the valve to shut off a measured flow almost instantaneously. When the ampoules are to be placed in the cups immediately after filling, a relatively fast filling operation is necessary, if advantage is to be taken of the capacity of a machine constructed in accordance with this invention. Such a machine has been operated at a speed of over 7,000 ampoules per hour, for which an ampoule must be placed in a cup approximately every half second, although for manual operations with a limited number of operators, the speed may have to be reduced. Or, the ampoules may be filled by a machine having a bank of filling valves, operated simultaneously, and adapted to fill a number of ampoules simultaneously, the filling valves thereof preferably being constructed in accordance with my aforementioned application Ser. No. 60,925. A number of trays may be utilized in connection with such a machine, the trays being adapted to hold a number of ampoules to be filled simultaneously. After the ampoules are placed in the trays, the trays are taken to the filling machine, and after filling, may be passed through a sealing machine constructed in accordance with this invention. It will be understood, of course, that any or all of such operations may be made substantially automatic.

The apparatus of Fig. 37 is adapted to seal the filled ampoules carried by the trays, which are adapted to contain nine ampoules A, or any other desired number, and include a bottom plate 160, a top plate 161 and ends 162. The bottom plate 160 is imperforate, but the top plate 161 is provided with spaced holes of the correct size to receive the ampoules. Each end 162 of the trays may be provided with a slot 163 on each side, to accommodate the spinning belts 22 and 22', which, in the apparatus of Fig. 37, engage the ampoules adjacent the bottoms thereof. The apparatus of Fig. 37 also includes guide plates 24' and 25', between the edges of which the necks 18 of the ampoules A pass, as before. Flame pipe 37' is adapted to direct heating flames against the sealing sections 20 of the ampoules, while the fingers F'' are adapted to engage the underside of the upper portion 21 of each ampoule, and to remove the upper portion after the sealing section has been softened and melted together by the heating flames. The fingers F'' may be similar to the fingers F of the apparatus of Fig. 1, or provided with a fork 164 on the end of a shank 165, the shank 165 enabling the finger to be inserted between two ampoules, and the fork 164 to engage the upper end of the ampoule just ahead. The fingers F'' may be pivotally mounted on an endless chain 39', and the removed upper ends of the ampoules discharged into a chute 45'.

In the apparatus of Fig. 37, the movement of the fingers F'' must, of course, be synchronized with the movement of the trays T and the ampoules A carried thereby. For this purpose, the endless chain 10'' may be provided with a plurality of spaced lugs 166, the distance between the ends 162 of the trays preferably being so proportioned that one of the lugs 166 will catch behind either the front end or the rear end of the tray, and the ampoules will be automatically positioned with respect to the fingers. The moving parts of the apparatus may be driven by a motor 86', having a speed reducer 87' on which a sprocket for a drive chain 168 is mounted. The drive connection between chain 168 and drive chain 169 for the chain 39' of the pull assembly, as well as the drive connection to drive sprocket 12 for chain 10'' and the bevel gears 98 for the endless belts 22 and 22', are preferably conventional.

The carrier and spinning section is also subject to variation, an example of which is illustrated in Figs. 38 to 49, inclusive. Thus, the spinning belts may be eliminated entirely, and instead a spinning and restraining strip T, or spinning and pressure element, shown in Figs. 38 to 40, utilized. The strip T may extend for the entire length of the spinning section, or for any length desired, the inside of the strip being engaged by the lower portion 17 of an ampoule A, the latter being turned by engagement with the surface of the strip as it is moved along by the conveyor. The strip T is therefore made of a material, such as rubber, which has a relatively high coefficient of friction with glass. The strip T, as in Fig. 38, may be mounted on one or more brackets 175, adjustable toward and away from the ampoules by one or more thumb screws 27', each extending through a slot 26' in the bracket, to accommodate the various diameters of ampoules of different nominal sizes. The surface of the strip T engaged by the ampoule may be provided with a series of ribs or corrugations 176, extending generally longitudinally but slanting downwardly in the direction of movement, so as to tend to press the ampoule downwardly against the carrier, such ribs thus constituting one form of means for restraining axial movement of the lower portion of each container or ampoule. The strip T' of Fig. 41, which may be utilized instead of strip T, is wider at the top than at the bottom, thus being provided with a bulge 177 adapted to engage the shoulder of the ampoule just above the lower portion 17, as shown. Strip T with its ribs 176 is particularly adapted to be utilized when the axial restraint necessary does not involve a particularly large force, while the strip T' is more especially adapted to be utilized when a greater force of axial restraint is involved, such as when a "pre-pull" is utilized. However, the strip T' may also be used when a smaller restraining force is normally necessary, in order to insure that each of the ampoules will be held down securely. Guide plates adapted to engage the lower necks of ampoules, such as plates 24 and 25 of Fig. 3, or the alternative guide plates of Figs. 22 and 23, may be utilized in connection with the spinning surfaces, in which case the ribs or shoulders may be eliminated, if desired.

The carrier for use in conjunction with the strips T or T' may be constructed as described previously, although a somewhat simpler form may be used, which does not require the ampoules to be placed in cups and therefore may tend to speed up the placement of the ampoules in or on the carrier. Thus, each of the strips 14, mounted on the chain 10, may be provided merely with a vertically disposed right angle having a longitudinal leg 178 and a lateral leg 179, the former holding the ampoule against the strip T or T' as in Figs. 38 and 47–49, and the latter carrying the ampoule along in the direction of movement, indicated by the arrows of Figs. 47–49. As will be evident, the ampoules are readily placed in the angles, since they need merely be inserted inside the leg 178, as the strip T or T' will then pull them back against the leg 178, while the legs 178 and 179 may be of a dimension to accommodate several different sizes of ampoules, such as ampoules having a lower body section 17, 17a, 17b, 17c or 17d, respectively, of Figs. 42 to 46, respectively. The fit of the ampoule between the angle and the spinning strip is preferably sufficiently loose that the ampoules will spin freely and will not bind, but nevertheless sufficiently close that the ampoules will stay in alignment as they pass along the spinning strips. The legs 178 and 179 are, of course, preferably made of metal or other relatively smooth material, which may be polished, if desired, to permit rapid spinning of the ampoules with a minimum of friction. Fingers F, blocks 40 and finger supporting rods 141, as well as flame pipe 37 and nozzles 38, may be provided as shown in Fig. 38, thus corresponding to one of the forms previously described, although any other variation thereof may be utilized.

To accommodate different nominal sizes of ampoules, the guide bars 15 along which the chain strips 14 slide, may be adjustable vertically, as by being mounted on an inverted U-shaped bracket 180, through the downwardly extending legs of which a positioning rod 181 passes in a transverse direction, rod 181 being provided with a pair of cams 182 resting on a supporting plate 183, from which one or more pairs of guide posts 184 may extend vertically through the bracket 180 and the lower legs of guide bars 15. Positioning rod 181 may be turned in any suitable manner to raise or lower guide bars 15 through cams 182, as by a crank 185 connected to a pinion 186, in turn engaging a gear 187, the latter being mounted on rod 181. Thus, when the crank 185 is turned, the cams 182 will also turn, to lower or raise the bracket 180 and guide bars 15, in accordance with the direction of rotation of the crank. A worm and gear may be substituted for the pinion 186 and gear 187, such a worm and gear construction being sometimes preferable because it may be made self-locking. Also, any other suitable type of lifting and positioning mechanism for the guide bars 15 may be used, as the primary purpose thereof is to enable the guide bars 15 to be raised and lowered so as to place the upper ends of the ampoules in a position to be engaged by the fingers F at about the same level, thereby avoiding undue adjustment of the pull assembly P, shown in Figs. 1, 2, etc. The spining strip, as in Figs. 42 to 46, may also remain at one level, except for perhaps the largest size, so that only a slight vertical adjustment of the height of the pull assembly P of Figs. 1, 2 etc. is necessary to accommodate the several different sizes of ampoules shown. It will usually suffice to provide only one size of angle for a number of ampoule sizes, since the height of longitudinal leg 178 can be equal to a distance slightly less than the cut-off point of the smallest size to be accommodated, as in Figs. 42–46. Thus, the cut-off line 189 may be at substantially the same level for all ampoules of the sizes accommodated. In addition, the width of angle leg 179 may be slightly less than the diameter of the smallest size of ampoule to be accommodated, as will be evident from Figs. 47–49. As will be noted, the use of different heights of guide bars 15, i. e. for the various ampoules, avoids the necessity for special attachments, such as that shown in Figs. 13 and 14, for accommodating different diameters of ampoules. Also, even though a separate chain 10 provided with a series of plates 14 and suitable angles may need to be provided for each different size of ampoule, at the same time the carrier chain is relatively quickly changed, while an entire set of plates 14 and the angles thereon are relatively easily made and attached to the chain. Thus, the total cost of separate chains and angles for the different sizes of ampoules, may be less than the cost of special cups and attachments, particularly when the latter involve special springs and perhaps considerable machining.

From the foregoing, it will be evident that the method and apparatus of this invention fulfill to a marked degree the requirements and objects hereinbefore set forth. The simultaneous spinning and heating of a plurality of containers in succession, not only tends to cause the heating to be uniform about the periphery of the section, but also permits the top to be removed more readily. Support of the upper end of the ampoule during heating, particularly when combined with restraint of axial movement of the lower end of the ampoule, prevents slumping of the heated section, and also tends to prevent blowouts. Partial restraint of rotation of the upper end of the ampoule during support or pre-pull and substantial or complete restraint during the final pull-off, insure that a twisted seal, rather than a straight pulling seal, will be produced, thereby insuring more satisfactory seals, with a minimum of fractures and more complete fusion. The "pre-pull," when used, is also of benefit, since the heated section may become sealed at that time, thus tending to insure that the final melting down will not cause any holes or similar defects to develop, and sufficient room for expansion of air or gases is provided. When the upper end of the container or ampoule is finally drawn off, the string or elongation of the glass tends to follow with the top. However, in case a stringer is left on the lower part of the container, continued application of the heating flames will melt the stringer down, so as to form a smooth, rounded seal.

The apparatus of this invention is particularly adapted to carry out the above indicated objectives, and also possesses numerous mechanically advantageous features. The use of oppositely driven belts, for spinning, particularly when such belts are driven at different speeds and pressed inwardly against the ampoules or containers by spring mounted rollers, insures that all ampoules will be effectively rotated or spun, yet permits the apparatus to accommodate different sizes of ampoules or containers without the necessity of adjustment of the lateral positions of the belts. The guide plates, between the edges of which the neck or lower neck of each ampoule moves, not only restrain the lower portion of the ampoule from upward movement, when a pull is exerted thereon, but also tend to shield the spinning belts from heat. The lateral adjustability of the guide plates insures that ampoules of a large variety of sizes may be sealed, while flexible guide plates, when used, accommodate considerable variation in ampoule neck diameter or location.

The use of an ampoule engaging strip for spinning, particularly when the spinning surface of the strip is provided with ribs or corrugations, or a shoulder for holding the ampoules and restraining axial movement, is quite advantageous, since belts, rollers and a drive mechanism and associated moving parts, can be eliminated. Also, provision may be made for adjustment of the height of the carrier chain, thus permitting ampoules of various sizes to be accommodated more readily. The use of a spinning surface also permits angles to be utilized for carrying the ampoules along, such angles tending to facilitate the placement of the ampoules on the carrier.

The pull assembly, mounted above and principally to one side of the path of travel of the ampoules, permits the tops of the ampoules to be pulled off in any desired manner and the movement of the fingers or hooks to be synchronized with the movement of the ampoules. The generally vertical path of traverse of the fingers, and also the endless chain or other means on which the same are mounted, permits the final pull to be in an upward direction, thus tending to eliminate transverse strain on the ampoules, either against the guide plates or in the cups. The adjustable mounting of the pull assembly permits the operation to be varied in accordance with different conditions, and also permits the position and/or amount of pull to be varied as desired.

The adjustably mounted "pre-pull" sprocket, which is highly useful when a "pre-pull" is desired, causes the chain to be elevated at any desired point, and to a desired extent, and also permits the position and extent of "pre-pull" to be adjusted in any desired manner. Particularly when a balancing sprocket, engaging the chain from above, is utilized in connection with the "pre-pull" sprocket, the chain is not elevated by the "pre-pull" sprocket until it reaches the same. Also, the balancing sprocket may be offset from the "pre-pull" sprocket, to support the overhanging weight of the arms and fingers more adequately.

The preferred forms of hooks or fingers shown have many advantages in that they are adapted to engage a relatively large variety of sizes, without the necessity of any substantial adjustment of the pull assembly. As will be evident from Figs. 7 to 11, inclusive, each different size of ampoule may be positioned so that the neck is disposed at substantially the same elevation, i. e. that of the guide plates. A fork or finger having a tapered slot in front, leading to a central arcuate hole, and forming a well or depression surrounding the hole, enables the sealing section of reduced cross sectional area to pass into the slot, and the central hole to engage the bulge or filling cup at the upper end of the ampoule.

When large variations in the upper or guide cups of the ampoules are encountered, the finger of Fig. 12 is particularly advantageous. When attachments adapted to be mounted in the ampoule receiving cups, for different sizes of ampoules, are utilized, it is unnecessary to change the cups on the conveyor chain. Of course, the type of chain may be varied, as well as the type of cup, such as one having a central hole to accommodate the lower extension of an ampoule, as in Fig. 30, or a deeper cup extending through the chain. While a belt or other means for moving the ampoules along the predetermined path may be utilized, a chain or other device which can be synchronized accurately with the movement of the ampoule engaging hooks or fingers, is preferred. Also, the ampoules may be mounted in trays or the like, for more convenient handling during filling and packaging. A separate attachment, as in Fig. 36, may be provided for flipping the tops of relatively small ampoules out of the fingers, or slightly different fingers may be utilized, to permit the small ampoule tops to slide out directly into the discharge chute or trough. When plain top ampoules are to be sealed, gripping devices, which may be operated magnetically, can be utilized to remove the tops of the ampoules, while the gripping devices may also be operated by a cam or other suitable actuating device.

Many variations may be made in the apparatus of this invention. As indicated, the flame pattern may be varied considerably, the fuel and other constituents forming the flame may be changed and adjusted as desired, while cooling jets may be directed against the final ampoule tops subsequent to sealing. The drive arrangements described herein are illustrative only, and as will be evident, various other drive arrangements may be utilized. Also, the point of engagement of the spinning belts or spinning surfaces may be varied, and the types of adjustments and other phases of the positioning of the various parts may be varied. As will be evident, an endless belt may be utilized for carrying away the removed tops, instead of a chute or trough adapted to discharge into a bin or the like, or the removal chute may discharge onto an endless belt. Also, the sealed ampoules may be carried away by a belt, or taken to the next operation, such as labeling and/or packaging, in any other suitable manner. As will also be evident, containers other than ampoules may be sealed by the apparatus of this invention, and such containers may have various shapes or be of various sizes. Preferably, of course, such containers include a neck or rim which can be engaged by the guide plates or other means for restraining upward movement during spinning and heating.

While different embodiments of this invention, and certain variations therein, have been illustrated and described, it will be understood that other embodiments may exist, and that other variations may be made, all without departing from the spirit and scope of this invention.

What is claimed is:

1. Apparatus for sealing a plurality of elongated containers formed of glass or the like and having material in the lower portion thereof, and having a neck of reduced cross-sectional area above the lower portion which comprises means for passing a plurality of such containers in succession along a predetermined path; means for imparting to such containers a spinning motion about the longitudinal axis thereof; means for applying heat to a predetermined section of such containers during such spinning, such sections being intermediate the ends thereof, and also spaced from any material in the lower portion of said containers; means for restraining axial movement of the lower portion of each said container; means for continuously supporting the upper end of each said container, and then exerting an axial pull to cause the upper portion of said container to be removed from the lower portion thereof; said means for restraining axial movement of the lower portion of each container including spaced plates provided with relatively flexible strips adapted to engage said container necks.

2. Apparatus for sealing a plurality of elongated containers formed of glass or the like and having material in the lower portion thereof, and having a neck of reduced cross-sectional area above the lower portion which comprises means for passing a plurality of such containers in succession along a predetermined path; means for imparting to such containers a spinning motion about the longitudinal axis thereof; means for applying heat to a predetermined section of such containers during such spinning, such sections being intermediate the ends thereof, and also spaced from any material in the lower portion of said containers; means for restraining axial movement of the lower portion of each said container; means for continuously supporting the upper end of each said container, and then exerting an axial pull to cause the upper portion of said container to be removed from the lower portion thereof; wherein each said container is provided with a neck of reduced cross-sectional area above the lower portion thereof; said means for restraining axial movement of the lower portion of each container including spaced plates provided with spring-pressed slides, carrying strips adapted to engage said container necks.

3. Apparatus for sealing a plurality of elongated containers formed of glass or the like and having material in the lower portion thereof, each said container having an enlarged top, which comprises means for passing a plurality of such containers in succession along a predetermined path; means for imparting to such containers a spinning motion about the longitudinal axis thereof; means for applying heat to a predetermined section of such containers during such spinning, such sections being intermediate the ends thereof, and also spaced from any material in the lower portion of said containers; means for restraining axial movement of the lower portion of each said container; and means for exerting an axial pull on the upper end of each said container when the section being heated becomes sufficiently softened to permit the upper portion of said container to be removed from the lower portion thereof, said pulling means including a plurality of forks for engaging said containers below said enlarged top, each said fork having a central well, and a slot having angularly disposed edges extending from the front of said fork to the central portion of said well.

4. Apparatus for sealing a plurality of elongated containers formed of glass or the like and having material in the lower portion thereof, which comprises conveyor means for moving a plurality of such containers in succession along a predetermined path; means adapted to engage the lower portion of each container for imparting to such containers a spinning motion about the longitudinal axis thereof; means for directing heating flames against an upper section of such containers during such spinning; means for restraining axial movement of the lower portion of each said container; a plurality of removal devices for exerting an axial pull on the upper end of successive containers to cause the upper portion of each said container to be removed from the lower portion thereof; means for moving said removal devices about a predetermined path, said upper portion removal devices including jaws adapted to close on the upper end of a container; and magnetic means for closing said jaws including a magnet extending from a point adjacent the approach of said containers to said flame directing means to at least the point of removal of said container upper portion from its lower portion.

5. Apparatus for sealing a plurality of elongated containers formed of glass or the like and having material in the lower portion thereof, which comprises conveyor means for moving a plurality of such containers in succession along a predetermined path; means adapted to engage the lower portion of each container for imparting to such containers a spinning motion about the longitudinal axis thereof; means for directing heating flames against an upper section of such containers during such spinning; means for restraining axial movement of the lower portion of each said container; a plurality of removal devices for exerting an axial pull on the upper end of successive containers to cause the upper portion of each said container to be removed from the lower portion thereof; an endless chain for moving said removal devices in synchronized relation with travel of said containers during said pull; sprockets for said chain between which sprockets said devices engage said containers; an intermediate sprocket adapted to raise said chain at the position at which said section being heated becomes softened; and a balancing sprocket disposed oppositely of said chain from said intermediate sprocket.

6. Apparatus for sealing a plurality of elongated containers formed of glass or the like and having material in the lower portion thereof, which comprises conveyor means for moving a plurality of such containers in succession along a predetermined path; means adapted to engage the lower portion of each container for imparting to such containers a spinning motion about the longitudinal axis thereof; means for directing heating flames against an upper section of such containers during such spinning; means for restraining axial movement of the lower portion of each said container; a plurality of removal devices for exerting an axial pull on the upper end of successive containers to cause the upper portion of each said container to be removed from the lower portion thereof; said conveyor means including a plurality of cups, each of said cups being provided with an aperture in the side wall adjacent the upper end thereof; an attachment for mounting containers of different diameters, each such attachment being adapted to extend into said cup and being provided with a lateral groove adapted to be positioned against the aperture in said cup, said attachment also having a well adapted to receive a container of smaller diameter than said cup; and a spring adapted to encircle said cup and having a portion adapted to extend through said cup aperture and into said attachment groove, to retain said attachment in said cup.

7. Apparatus for sealing a plurality of elongated containers formed of glass or the like and having material in the lower portion thereof, which comprises conveyor means for moving a plurality of such containers in succession along a horizontal path; means for applying heat to a predetermined section of such containers during a predetermined time, such sections being intermediate the ends thereof, and also spaced from any material in the lower portion of said containers; means for restraining axial movement of the lower portion of each said container; means for exerting an axial pull on the upper end of each container to cause the upper portion of said container to be removed from the lower portion thereof; a pair of endless belts moved around spaced endless paths in the same direction, with one said belt engaging said containers on one side and the other said belt engaging said containers on the opposite side; a plurality of rollers mounted on pivoted shafts, for holding each said belt against said containers; resilient means acting on said shafts, for pushing said rollers against said belts; and means for driving said belts at different speeds, the belt having a container engaging portion which moves opposite to the general direction of movement of said containers being driven slower and the opposite belt faster.

8. Apparatus for sealing a plurality of elongated containers formed of glass or the like and having material in the lower portion thereof, which comprises conveyor means for moving a plurality of such containers in succession along a horizontal path; means for imparting to such containers a spinning motion about the longitudinal axis thereof; means for applying heat to a predetermined section of such containers during such spinning, such sections being intermediate the ends thereof, and also spaced from any material in the lower portion of said containers; means for restraining axial movement of the lower portion of each said container; a pair of adjustable supports disposed vertically at front and rear positions and to one side of said spinning means, said front adjustable support containing a drive shaft; an upper sprocket mounted adjacent the upper end of said front support and driven from the drive shaft therein; a rear sprocket disposed adjacent the upper end of said rear adjustable support; an intermediate sprocket disposed below but rearwardly of said upper sprocket; an endless chain extending around said sprockets; a supporting bar extending from said upper sprocket downwardly to said intermediate sprocket, then rearwardly to said rear support and farther rearwardly to said rear sprocket, said supporting bar having a longitudinal slot therein between said intermediate sprocket and said rear support; a block mounted for pivotal, longitudinal and vertical adjustment on said bar at said slot; a pair of sprockets carried in spaced position by said block, one of said block sprockets engaging said chain from beneath and the other said block sprocket engaging said chain from above, but laterally from said lower block sprocket, so as to compensate overhanging weight carried by said chain and extending toward the path of said containers; a plurality of container engaging devices mounted in spaced positions on said chain and adapted to engage the upper ends of said containers to cause the upper portion of each said container to be removed from the lower portion thereof when heated; a vertically disposed plate having edges conforming generally to the path of said chain and adapted to form a cam for guiding said container engaging devices; and a discharge chute for receiving the removed upper ends of said containers, said chute extending through said plate.

9. Apparatus for sealing a plurality of elongated containers formed of glass or the like and having material in the lower portion thereof, which comprises conveyor means for moving a plurality of such containers in succession along a horizontal path; means for imparting to such containers a spinning motion about the longitudinal axis thereof; means for applying heat to a predetermined section of such containers during such spinning, such sections being intermediate the ends thereof, and also spaced from any material in the lower portion of said containers; means for restraining axial movement of the lower portion of each said container; a plurality of devices for engaging the upper ends of said containers to cause the upper portion of each said container to be removed from the lower portion thereof, each said device including a fork having a central aperture and adapted to engage the upper end of a container; and means for moving said container engaging devices around a closed path which extends in spaced relation to said container path for a part of the heating portion, then upwardly for the removal of the upper portions of said containers and to a point of discharge thereof from said devices, and then back to the beginning of the spaced relation portion of said path, said moving means including an endless chain, a plurality of blocks pivotally mounted at spaced positions on said chain, a rod extending laterally from each said block and carrying at its outer end one of said forks, each said block, rod and fork being so mounted that when hanging free in depending relation from said chain, the front end of said fork will be tipped slightly upwardly.

10. Apparatus for sealing a plurality of elongated containers formed of glass or the like and having material in the lower portion thereof, which comprises conveyor means for moving a plurality of such containers in succession along a horizontal path; means for imparting to such containers a spinning motion about the longitudinal axis thereof; means for applying heat to a predetermined section of such containers during such spinning, such sections being intermediate the ends thereof, and also spaced from any material in the lower portion of said containers; means for restraining axial movement of the lower portion of each said container; a plurality of devices for engaging the upper ends of said containers to cause the upper portion of each said container to be removed from the lower portion thereof, each said device including a laterally extending rod having a jaw at its outer end provided with heat resistant material having less tendency than metal to break the glass of a container when striking the same, a slide movable longitudinally along said rod and having at its outer end a jaw adapted to cooperate with said rod jaw to clamp a portion of a container therebetween, said slide jaw being provided with similar heat resistant material and said slide also having an enlarged block formed of magnetic material at the end opposite said jaw, and a spring surrounding said rod and normally pressing said slide outwardly to separate said jaws; means for moving said container engaging devices around a closed path which extends in spaced relation to said container path for a part of the heating portion, then upwardly for the removal of the upper portions of said containers and to a point of discharge thereof from said devices, and then back to the beginning of the spaced relation portion of said path; and a magnet extending along the spaced relation portion of said path and also upwardly to the point of discharge of the upper portions of said containers, for attracting said slide block and causing said jaws to close during the travel of a container engaging device along the portion of said path at which said magnet is disposed.

11. Apparatus for sealing a plurality of elongated containers formed of glass or the like and having material in the lower portion thereof, said containers also having a neck just above the lower portion thereof, which comprises an endless chain moved along a path which includes an upper horizontal run and a lower return run therebeneath; a plurality of plates mounted in spaced positions along said chain and extending laterally therefrom; guide bars disposed at each side of said chain along the upper edges of which the laterally extending portions of said plates are adapted to slide; a cup mounted on each plate and adapted to receive a container; a pair of belts adapted to engage the lower portion of each container on opposite sides thereof, for imparting to such containers a spinning motion about the longitudinal axis thereof, each belt moving about a similar path lying generally in a horizontal plane and said belts being moved in the same direction about said paths so that the inside, container engaging portion of one belt will be moving in the opposite direction to the inside, container engaging portion of the other belt; a series of rollers adapted to press each said belt against said containers along the inside portion of the path of traverse of said belts; a post for each said roller, pivotal about a longitudinal axis and extending generally vertically, each said roller being rotatable about the axis of its post; a spring for each post attached to the lower end thereof below its pivot point, for pushing said roller toward and said belt into engagement with a container, said belts and rollers being thereby movable toward and away from the path of said containers so as to accommodate containers of different sizes; a pair of spaced, horizontally disposed guide plates disposed above said belts, each said plate having an inner edge of reduced section, whereby the necks of said containers may pass between said plate edges and said plates will restrain axial movement of the lower portion of each said container; means for directing heating flames against said containers above said necks, during at least a portion of such spinning, said plates tending to protect said spinning belts and rollers from said flames; and means for exerting an axial pull on the upper end of each said container to cause the upper portion of said container to be removed from the lower portion thereof.

12. Apparatus for sealing a plurality of elongated containers formed of glass or the like and having material in the lower portion thereof, each said container having an enlarged top, which comprises means for conveying a plurality of such containers in succession along a predetermined path; means for imparting to such containers a spinning motion about the longitudinal axis thereof; means for applying heat to a predetermined section of such containers during such spinning, such sections being intermediate the ends thereof, and also spaced from any material in the lower portion of said containers; means for restraining axial movement of the lower portion of each said container; a plurality of container engaging devices for exerting an axial pull on the upper ends of said containers to cause the upper portion of each said container to be removed from the lower portion thereof; means for moving said container engaging devices around a closed path which extends in spaced relation to said container path for a part of the heating portion, then upwardly for the removal of the upper portions of said containers and to a point of discharge thereof from said devices, and then back to the beginning of the spaced relation portion of said engaging devices path, said moving means including a plurality of laterally extending rods, on the outer end of each of which a container engaging device is mounted, and the inner end of which is mounted for pivoting movement about a spaced axis; and a guide plate for restraining pivotal movement of said rods and container engaging devices as said devices move into the spaced relation portion of said path, to permit each said device to move into the space between two containers.

13. A machine for sealing off glass ampoules having a material containing portion merging upwardly through a restricted neck portion into an upwardly directed stem section, comprising an ampoule endless conveyer having a substantially straight and approximately horizontal upper run; a plurality of ampoule carrying flat strip members separately fixed along the conveyer; an upturned, smooth wall along one side portion of each of the strip members; a smooth wall extending from the upturned wall transversely of the strip member a distance less than the diameter of the ampoule to be carried on the strip member; a heating element extending by a length equal to a plurality of said strip members along one side of and above said conveyer run, said element being fixed in elevation above said upturned wall for a given height at which said stem section is to be sealed off; a bracket fixed for a given diameter of ampoule extending a distance approximately equal to that of said heating element along and above the side of said conveyer run opposite said smooth walls of the strip members; a resilient friction facing fixed along the length of said bracket, the horizontal spacing apart of said upturned wall and of said facing being such that an ampoule presented therebetween on its carrying strip will be engaged by the facing to press the ampoule yieldingly against said upturned wall in each instance; a second endless conveyer spaced above said first conveyer, said second conveyer having an underrun paralleling the line of travel of said first conveyer run, said second conveyer having an upwardly inclined end run, from the upper end of which inclined run the conveyer continues by an overrun and back down into said underrun; a plurality of stem section engaging and lifting members carried by and spaced along the said second conveyer to be spaced above said strip members; and means driving said two conveyers to have said upper run of the first conveyer and said underrun of the second conveyer travel in a common direction toward said inclined end run; said transverse walls being located on said strip members to abut and carry along ampoules thereon in said travel direction.

14. A machine for sealing off glass ampoules having a material containing portion merging upwardly through a restricted neck portion into an upwardly directed stem section, comprising an ampoule endless conveyer having a substantially straight and approximately horizontal upper run; a plurality of ampoule carrying flat strip members separately fixed along the conveyer; an upturned, smooth wall along one side portion of each of the strip members; a smooth wall extending from the upturned wall transversely of the strip member a distance less than the diameter of the ampoule to be carried on the strip member; a heating element extending by a length equal to a plurality of said strip members along one side of and above said conveyer run, said element being fixed in elevation above said upturned wall for a given height at which said stem section is to be sealed off; a bracket fixed for a given diameter of ampoule extending a distance approximately equal to that of said heating element along and above the side of said conveyer run opposite said smooth walls of the strip members; a resilient friction facing fixed along the length of said bracket, the horizontal spacing apart of said upturned wall and of said facing being such that an ampoule presented therebetween on its carrying strip will be engaged by the facing to press the ampoule yieldingly against said upturned wall in each instance; a second endless conveyer spaced above said first conveyer, said second conveyer having an underrun paralleling the line of travel of said first conveyer run, said second conveyer having an upwardly inclined end run, from the upper end of which inclined run the conveyer continues by an overrun and back down into said underrun; a plurality of stem section engaging and lifting members carried by and spaced along the said second conveyer to be spaced above said strip members; and means driving said two conveyers to have said upper run of the first conveyer and said underrun of the second conveyer travel in a common direction toward said inclined end run; said transverse walls being located on said strip members to abut and carry along ampoules thereon in said travel direction; a pair of spaced apart guides between which said first conveyer upper run travels; and said strip members overlapping and riding on said guides, thereby maintaining said upturned walls substantially vertical.

15. A machine for sealing off glass ampoules having a material containing portion merging upwardly through a restricted neck portion into an upwardly directed stem section, comprising an ampoule endless conveyer having a substantially straight and approximately horizontal upper run; a plurality of ampoule carrying flat strip members separately fixed along the conveyer; an upturned, smooth wall along one side portion of each of the strip members; a smooth wall extending from the upturned wall transversely of the strip member a distance less than the diameter of the ampoule to be carried on the strip member; a heating element extending by a length equal to a plurality of said strip members along one side of and above said conveyer run, said element being fixed in elevation above said upturned wall for a given height at which said stem section is to be sealed off; a bracket fixed for a given diameter of ampoule extending a distance approximately equal to that of said heating element along and above the side of said conveyer run opposite said smooth walls of the strip members; a resilient friction facing fixed along the length of said bracket, the horizontal spacing apart of said upturned wall and of said facing being such that an ampoule presented therebetween on its carrying strip will be engaged by the facing to press the ampoule yieldingly against said upturned wall in each instance; a second endless conveyer spaced above said first conveyer, said second conveyer having an underrun paralleling the line of travel of said first conveyer run, said second conveyer having an upwardly inclined end run, from the upper end of which inclined run the conveyer continues by an overrun and back down into said underrun; a plurality of stem section engaging and lifting members carried by and spaced along the said second conveyer to be spaced above said strip members; and means driving said two conveyers to have said upper run of the first conveyer and said underrun of the second conveyer travel in a common direction toward said inclined end run; said transverse walls being located on said strip members to abut and carry along ampoules thereon in said travel direction; said facing having vertically spaced apart ribs extending therefrom and therealong and sloping diagonally from the top of the facing downwardly to the bottom in the direction of travel of said conveyers.

16. A machine for sealing off glass ampoules having a material containing portion merging upwardly through a restricted neck portion into an upwardly directed stem section, comprising an ampoule endless conveyer having a substantially straight and approximately horizontal upper run; a plurality of ampoule carrying flat strip members separately fixed along the conveyer; an upturned, smooth wall along one side portion of each of the strip members; a smooth wall extending from the upturned wall transversely of the strip member a distance less than the diameter of the ampoule to be carried on the strip member; a heating element extending by a length equal to a plurality of said strip members along one side of and above said conveyer run, said element being fixed in elevation above said upturned wall for a given height at which said stem section is to be sealed off; a bracket fixed for a given diameter of ampoule extending a distance approximately equal to that of said heating element along and above the side of said conveyer run opposite said smooth walls of the strip members; a resilient friction facing fixed along the length of said bracket, the horizontal spacing apart of said upturned wall and of said facing being such that an ampoule presented therebetween on its carrying strip will be engaged by the facing to press the ampoule yieldingly against said upturned wall in each instance; a second endless conveyer spaced above said first conveyer, said second conveyer having an underrun paralleling the line of travel of said first conveyer run, said second conveyer having an upwardly inclined end run, from the upper end of which inclined run the conveyer continues by an overrun and back down into said underrun; a plurality of stem section engaging and lifting members carried by and spaced along the said second conveyer to be spaced above said strip members and means driving said two conveyers to have said upper run of the first conveyer and said underrun of the second conveyer travel in a common direction toward said inclined end run; said transverse walls being located on said strip members to abut and carry along ampoules thereon in said travel direction; said stem section lifting members comprising in each instance a fork to straddle said sections; and mounting means between said second conveyer and said forks to carry said forks in said direction in fixed open end presentment horizontally toward said sections.

17. A machine for sealing off glass ampoules having a material containing portion merging upwardly through a restricted neck portion into an upwardly directed stem section, comprising an ampoule endless conveyer having a substantially straight and approximately horizontal upper run; a plurality of ampoule carrying flat strip members separately fixed along the conveyer; an upturned, smooth wall along one side portion of each of the strip members; a smooth wall extending from the upturned wall transversely of the strip member a distance less than the diameter of the ampoule to be carried on the strip member; a heating element extending by a length equal to a plurality of said strip members along one side of and above said conveyer run, said element being fixed in elevation above said upturned wall for a given height at which said stem section is to be sealed off; a bracket fixed for a given diameter of ampoule extending a distance approximately equal to that of said heating element along and above the side of said conveyer run opposite said smooth walls of the strip members; a resilient friction facing fixed along the length of said bracket, the horizontal spacing apart of said upturned wall and of said facing being such that an ampoule presented therebetween on its carrying strip will be engaged by the facing to press the ampoule yieldingly against said upturned wall in each instance; a second endless conveyer spaced above said first conveyer, said second conveyer having an underrun paralleling the line of travel of said first conveyer run, said second conveyer having an upwardly inclined end run, from the upper end of which inclined run the conveyer continues by an overrun and back down into said underrun; a plurality of stem section engaging and lifting members carried by and spaced along the said second conveyer to be spaced above said strip members; and means driving said two conveyers to have said upper run of the first conveyer and said underrun of the second conveyer travel in a common direction toward said inclined end run; said transverse walls being located on said strip members to abut and carry along ampoules thereon in said travel direction; said fixed facing having an upper, longitudinally disposed, resilient portion partially to enter at least said ampoule neck portion restriction as a means of resiliently restraining upward axial travel of the ampoule.

18. A machine for sealing off glass ampoules having a material containing portion merging upwardly through a restricted neck portion into an upwardly directed stem section, comprising an ampoule endless conveyer having a substantially straight and approximately horizontal upper run; a plurality of ampoule carrying flat strip members separately fixed along the conveyer; an upturned, smooth wall along one side portion of each of the strip members; a smooth wall extending from the upturned wall transversely of the strip member a distance less than the diameter of the ampoule to be carried on the strip member; a heating element extending by a length equal to a plurality of said strip members along one side of and above said conveyer run, said element being fixed in elevation above said upturned wall for a given height at which said stem section is to be sealed off; a bracket fixed for a given diameter of ampoule extending a distance approximately equal to that of said heating element along and above the side of said conveyer run opposite said smooth walls of the strip members; a resilient friction facing fixed along the length of said bracket, the horizontal spacing apart of said upturned wall and of said facing being such that an ampoule presented therebetween on its carrying strip will be engaged by the facing to press the ampoule yieldingly against said upturned wall in each instance; a second endless conveyer spaced above said first conveyer, said second conveyer having an underrun paralleling the line of travel of said first conveyer run, said second conveyer having an upwardly inclined end run, from the upper end of which inclined run the conveyer continues by an overrun and back down into said underrun; a plurality of stem section engaging and lifting members carried by and spaced along the said second conveyer to be spaced above said strip members; and means driving said two conveyers to have said upper run of the first conveyer and said underrun of the second conveyer travel in a common direction toward said inclined end run; said transverse walls being located on said strip members to abut and carry along ampoules thereon in said travel direction; said stem section lifting members being carried by said second conveyer in a continuous orbit vertically disposed throughout; each of said lifting members being rockably supported by the second conveyer to swing freely downwardly throughout the length of said second conveyer underrun and said inclined run; and means limiting the backward swinging of the lifting members throughout travel in said overrun of the second conveyer to maintain the lifting members in stem section dumping positions.

19. A machine for sealing off glass ampoules having a material containing portion merging upwardly through a restricted neck portion into an upwardly directed stem section, comprising an ampoule endless conveyer having a substantially straight and approximately horizontal upper run; a plurality of ampoule carrying flat strip members separately fixed along the conveyer; an upturned, smooth wall along one side portion of each of the strip members; a smooth wall extending from the upturned wall transversely of the strip member a distance less than the diameter of the ampoule to be carried on the strip member; a heating element extending by a length equal to a plurality of said strip members along one side of and above said conveyer run, said element being fixed in elevation above said upturned wall for a given height at which said stem section is to be sealed off; a bracket fixed for a given diameter of ampoule extending a distance approximately equal to that of said heating element along and above the side of said conveyer run opposite said smooth walls of the strip members; a resilient friction facing fixed along the length of said bracket, the horizontal spacing apart of said upturned wall and of said facing being such that an ampoule presented therebetween on its carrying strip will be engaged by the facing to press the ampoule yieldingly against said upturned wall in each instance; a second endless conveyer spaced above said first conveyer, said second conveyer having an underrun paralleling the line of travel of said first conveyer run, said second conveyer having an upwardly inclined end run, from the upper end of which inclined run the conveyer continues by an overrun and back down into said underrun; a plurality of stem section engaging and lifting members carried by and spaced along the said second conveyer to be spaced above said strip members; and means driving said two conveyers to have said upper run of the first conveyer and said underrun of the second conveyer travel in a common direction toward said inclined end run; said transverse walls being located on said strip members to abut and carry along ampoules thereon in said travel direction; said stem section lifting members being carried by said second conveyer in a continuous orbit vertically disposed throughout; each of said lifting members being rockably supported by the second conveyer to swing freely downwardly throughout the length of said second conveyer underrun and said inclined run; and means limiting the backward swinging of the lifting members throughout travel in said overrun of the second conveyer to maintain the lifting members in stem section dumping positions; said lifting members comprising forks having open ends directed toward said stem sections whereby the forks may be brought along in the path of said stem sections to straddle those sections.

20. In an ampoule sealing mechanism, an ampoule conveyer comprising a shiftable member; a plurality of ampoule carrying members located in fixed, spaced apart positions on the shiftable member; each of said carrying members comprising an ampoule supporting floor, a side wall extending in a fixed and upright manner from the floor, and a transverse wall extending across an end portion and upright of the floor, the transverse wall having a free end defining a length between that end and said upright wall to be less than the diameter of the ampoule to be carried thereon; a stationary, resilient friction strip fixed in position opposite said upright wall beyond said free end of the transverse wall to extend along a plurality of said carrying members, said friction strip being spaced from said side wall a distance to bear compressively against the side of an ampoule on said carrying member, said side and transverse walls being smooth to provide a free turning bearing of the ampoule thereagainst induced by the friction set up between the contact of the ampoule and said friction strip; and means to move said shiftable member to move said carrying members in that direction which will bring in each instance said transverse wall against the ampoule in each instance to carry along and to hold the ampoule upright while being axially rotated thereagainst and between said friction strip and said side wall.

JOHN D. RALSTON.

REFERENCES CITED

The following references are of record in the file of this patent:

UNITED STATES PATENTS

| Number | Name | Date |
| --- | --- | --- |
| 2,051,764 | Erdmann et al. | Aug. 18, 1936 |
| 2,168,509 | Bennett | Aug. 8, 1939 |
| 2,199,332 | Dichter | Apr. 30, 1940 |
| 2,258,408 | Cozzoli | Oct. 7, 1941 |
| 2,270,152 | Themak | Jan. 13, 1942 |
| 2,379,342 | Cozzoli | June 26, 1945 |
| 2,500,522 | Cozzoli | Mar. 14, 1950 |
| 2,529,109 | Shields | Nov. 7, 1950 |

FOREIGN PATENTS

| Number | Country | Date |
| --- | --- | --- |
| 551,599 | France | 1923 |
| 637,943 | Germany | 1936 |
| 671,056 | Germany | 1939 |
| 588,805 | Great Britain | 1947 |